US011776202B2

United States Patent
Li et al.

(10) Patent No.: US 11,776,202 B2
(45) Date of Patent: Oct. 3, 2023

(54) IMAGE PROCESSING METHOD AND APPARATUS, COMPUTER STORAGE MEDIUM, AND ELECTRONIC DEVICE

(71) Applicant: Tencent Technology (Shenzhen) Company Limited, Shenzhen (CN)

(72) Inventors: Qi Li, Shenzhen (CN); Qian Huang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 13 days.

(21) Appl. No.: 17/705,169

(22) Filed: Mar. 25, 2022

(65) Prior Publication Data

US 2022/0215618 A1 Jul. 7, 2022

Related U.S. Application Data

(63) Continuation of application No. PCT/CN2021/093232, filed on May 12, 2021.

(30) Foreign Application Priority Data

Jun. 10, 2020 (CN) .......................... 202010524473.7

(51) Int. Cl.
*G06T 15/60* (2006.01)
*G06T 15/80* (2011.01)
(Continued)

(52) U.S. Cl.
CPC .............. *G06T 15/60* (2013.01); *G06T 5/008* (2013.01); *G06T 15/50* (2013.01); *G06T 15/80* (2013.01); *G06T 17/00* (2013.01); *G06T 2215/12* (2013.01)

(58) Field of Classification Search
CPC ........... G06T 5/008; G06T 7/90; G06T 15/50; G06T 15/60; G06T 15/80; G06T 17/00; G06T 2215/12; Y02D 10/00
See application file for complete search history.

(56) References Cited

U.S. PATENT DOCUMENTS

| 2011/0026815 | A1 | 2/2011 | Han | |
| 2019/0295318 | A1* | 9/2019 | Levinson | G05D 1/0088 |
| 2020/0007734 | A1* | 1/2020 | Kagawa | G06T 5/009 |

FOREIGN PATENT DOCUMENTS

| CN | 108124079 A | 6/2018 |
| CN | 110998669 A | 4/2020 |

(Continued)

OTHER PUBLICATIONS

Luo, Shuang, et al. "Shadow removal based on separated illumination correction for urban aerial remote sensing images." Signal Processing 165 (2019): 197-208. (Year: 2019).*

(Continued)

*Primary Examiner* — Daniel F Hajnik
(74) *Attorney, Agent, or Firm* — Morgan, Lewis & Bockius LLP

(57) ABSTRACT

This application provides an image processing method performed by an electronic device. The method includes: acquiring a diffuse reflection map and a shadow map of a three-dimensional (3D) model of an object, wherein the 3D model is constructed from a plurality of photos of the object within a predefined lighting environment; acquiring a shadow texel in a shadow region of the diffuse reflection map according to a corresponding shadow region in the shadow map; querying an average color lookup table according to spatial coordinate information of the shadow texel for an average brightness difference corresponding to the shadow texel; and determining restoration color information according to the average brightness difference, and (Continued)

Acquire a diffuse reflection map, and acquire a shadow texel in a shadow region of the diffuse reflection map ⟋— S310

Query an average color lookup table according to spatial coordinate information of the shadow texel, and determine, according to a query result, an average brightness difference corresponding to the shadow texel ⟋— S320

Determine restoration color information according to the average brightness difference and color information corresponding to the shadow texel, and restore the color information of the shadow texel according to the restoration color information ⟋— S330 restoring color information of the shadow texel according to the restoration color information. In this way, shadow in the diffuse reflection map of the 3D model can be effectively removed or at least attenuated.

20 Claims, 9 Drawing Sheets

(51) Int. Cl.
   *G06T 15/50*   (2011.01)
   *G06T 5/00*    (2006.01)
   *G06T 17/00*   (2006.01)

(56) References Cited

FOREIGN PATENT DOCUMENTS

| | | |
|---|---|---|
| CN | 111612882 A | 9/2020 |
| EP | 3352138 A1 | 7/2018 |

OTHER PUBLICATIONS

B. Bascle. "Learning invariants to illumination changes typical of indoor environments: application to image color correction", International Journal of Imaging Systems and Technology (IJIST) 2007, available at: http://www.vincentlemaire-labs.fr/publis/ijist_2007_camera_ready.pdf (Year: 2007).*

Tencent Technology, ISR, PCT/CN2021/093232, dated Jul. 7, 2021, 2 pgs.

Yonggang Liu, "Summary of Practical Experiences in Normal Mapping: Case Study of 3D Modeling of Changzhou Biji Lane during Qing Dynasty", Art Science and Technology, May 15, 2016, Retrieved from the Internet: https://m.fx361.com/news/2016/1020/9063736.html.

Tencent Technology, WO, PCT/CN2021/093232, Jul. 7, 2021, 4 pgs.

Tencent Technology, IPRP, PCT/CN2021/093232, Dec. 13, 2022, 5 pgs.

Koki Nagano et al., "Deep Face Normalization", ACM Transactions on Graphics, ACM, NY, US, vol. 38, No. 6, Nov. 8, 2019, XP058686812, 16 pgs.

Nicolas Bonneel et al., "Intrinsic Decompositions for Image Editing", Computer Graphics Forum: Journal of the European Association for Computer Graphics, Wiley-Blackwell, Oxford, vol. 36, No. 2, May 23, 2017, XP071545427, 17 pgs.

Tencent Technology, Extended European Search Report and Supplementary Search Report, EP21822842.7, dated Apr. 11, 2023, 10 pgs.

Tencent Technology, Korean Office Action, KR Patent Application No. 10-2022-7014210, dated May 15, 2023, 6 pgs.

\* cited by examiner

IMAGE PROCESSING METHOD AND APPARATUS, COMPUTER STORAGE MEDIUM, AND ELECTRONIC DEVICE

CROSS-REFERENCE TO RELATED APPLICATIONS

This application is a continuation application of PCT Patent Application No. PCT/CN2021/093232, entitled "IMAGE PROCESSING METHOD AND APPARATUS, COMPUTER STORAGE MEDIUM, AND ELECTRONIC DEVICE" filed on May 12, 2021, which claims priority to Chinese Patent Application No. 202010524473.7, filed with the State Intellectual Property Office of the People's Republic of China on Jun. 10, 2020, and entitled "IMAGE PROCESSING METHOD AND APPARATUS, COMPUTER STORAGE MEDIUM, AND ELECTRONIC DEVICE", all of which are incorporated herein by reference in their entirety.

FIELD OF THE TECHNOLOGY

This application relates to the field of image processing technologies, and specifically, to a shadow removal technology in a picture.

BACKGROUND OF THE DISCLOSURE

In artistic designing, a three-dimensional modeling technology based on photogrammetry is generally used for modeling. The three-dimensional modeling technology based on photogrammetry needs to use multiple photos to perform three-dimensional modeling, and pixel color information of the multiple photos is used for restoring diffuse reflection color information of an object. Therefore, a color map of a generated model necessarily carries a shadow in an original photo.

To use the generated model in any illumination condition scenario, the shadow in the diffuse reflection map needs to be removed while keeping as many original color information as possible. Shadows in a diffuse reflection map include shadows generated by a direct light action and shadows generated by an ambient light action. Currently, the shadows generated by the direct light action are usually removed by using a tool such as Agisoft Texture Delighting, and the shadows generated by a non-direct light action are removed by using a tool such as Unity De-Lightingtool. However, problems such as a loss of map details, a change of hue, a color overflow, and existence of a color lump generally exist in these solutions for removing illumination shadows. Therefore, a model effect generated according to a shadow-removed diffuse reflection map is not realistic, and cannot be applied to a scenario of any illumination condition.

SUMMARY

Embodiments of this application provide an image processing method, an image processing apparatus, a computer readable storage medium, and an electronic device, which may improve, at least to a certain extent, shadow removal efficiency and quality of a diffuse reflection map, and further improve image quality of a model generated according to the shadow-removed diffuse reflection map.

According to an aspect of an embodiment of this application, an image processing method is provided, and is performed by an electronic device, including: acquiring a diffuse reflection map and a shadow map of a three-dimensional (3D) model of an object, wherein the 3D model is constructed from a plurality of photos of the object within a predefined lighting environment; acquiring a shadow texel in a shadow region of the diffuse reflection map according to a corresponding shadow region in the shadow map; querying an average color lookup table according to spatial coordinate information of the shadow texel for an average brightness difference corresponding to the shadow texel; and determining restoration color information according to the average brightness difference, and restoring color information of the shadow texel according to the restoration color information.

According to an aspect of an embodiment of this application, a non-transitory computer readable storage medium is provided, and one or more computer programs are stored thereon. When the computer programs are executed by a processor of an electronic device, the image processing method described in the foregoing embodiment is implemented.

According to an aspect of an embodiment of this application, an electronic device is provided, including one or more processors; and a storage apparatus, configured to store one or more programs that, when executed by the one or more processors, cause the electronic device to perform the image processing method in the foregoing embodiment.

In the technical solutions provided in some embodiments of this application, first a diffuse reflection map is acquired, and a shadow texel in a shadow region in the diffuse reflection map is acquired; then, an average color lookup table is queried according to spatial coordinate information of the shadow texel, and an average brightness difference corresponding to the shadow texel is determined according to a query result; and finally, restoration color information is determined according to the average brightness difference and color information corresponding to the shadow texel, and the color information of the shadow texel is restored according to the restoration color information. On one hand, the technical solutions of this application improve color restoration efficiency and quality. On the other hand, the technical solutions do not affect a color of a texel in a non-shadow region of a map, and avoid a problem such as a loss of map details, a change of hue, a color overflow, and existence of a color lump. Therefore, it is ensured that a generated model may be applied to a scenario of any illumination condition, and a picture effect and user experience are further improved.

DESCRIPTION OF EMBODIMENTS

Figure 1:
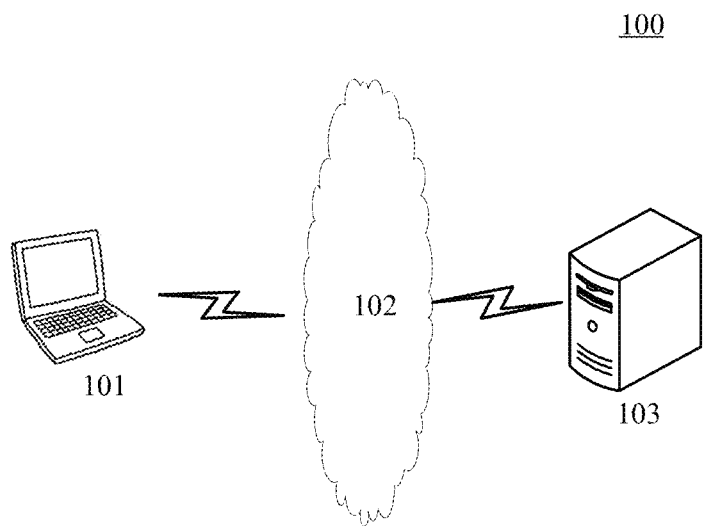
FIG. 1 is a schematic diagram of an exemplary system architecture that can be applied to the technical solutions of the embodiments of the present disclosure.

FIG. 1 shows a schematic diagram of an exemplary system architecture to which a technical solution according to an embodiment of this application is applicable.

As shown in FIG. 1, a system architecture 100 includes a terminal device 101, a network 102, and a server 103. The terminal device 101 may be any electronic device that has a display screen and a photographing unit, such as a tablet computer, a notebook computer, a desktop computer, a smartphone, a camera, and a video camera. The network 102 is configured to provide a medium for a communication link between the terminal device 101 and the server 103, and the network 102 may include various connection types, such as a wired communication link, a wireless communication link, and the like. The server 103 may be an independent server, or may be a server cluster including a plurality of servers.

It is to be understood that the quantities of terminal devices 101, networks 102, and servers 103 in FIG. 1 are merely exemplary. According to an actual requirement, the system architecture may have any quantity of terminal devices 101, networks 102, and servers 103.

In an embodiment of this application, a user performs multi-angle photographing on an object in an actual space that has a predefined lighting environment by using the photographing unit of the terminal device 101, and then sends photographed multiple photos to a device (such as the server 103) on which a model rendering engine is mounted to perform three-dimensional modeling based on the multiple photos of the object. It should be noted that the multiple photos may be captured when the object is subject to the same or different lighting conditions. In a three-dimensional modeling process, diffuse reflection color information of an object is restored by using pixel color information of the multiple photos. Because of direct light and/or non-direct light, shadows generally exist in the photos. During modeling, an illumination type and angle are adjusted according to an actual requirement. If the color information in the photos is used directly, shadows exist in a position in which no shadow is allowed to exist in a finally generated model, which results in model distortion and the model cannot be used in a scenario under any illumination condition.

In this embodiment of this application, after the user takes a photo by using the terminal device 101, the terminal device 101 may process, by using a rendering engine, a rigid mode corresponding to a model, and after a texture map is transferred, export the texture map, where the texture map includes a diffuse reflection map, a position map, a normal map, a shadow map, and an ambient occlusion map. After the texture map is acquired, the texture map may be sent to the server 103 by using the network 102, so that the server 103 restores a color of a shadow texel of the diffuse reflection map. After receiving the texture map, the server 103 may determine restoration color information according to the color information and an average brightness difference that are corresponding to the shadow texel in the diffuse reflection map, and may remove a shadow in the image by updating the color information of the shadow texel in the diffuse reflection map to the restoration color information. Further, the terminal device 101 may further send the photo to the server 103 by using the network 102, perform three-dimensional modeling based on these photos by using the rendering engine mounted on the server 103, and acquire a texture map formed in a modeling process.

In an embodiment of this application, the average brightness difference corresponding to the shadow texel may be acquired by using different methods, and the shadow texel is restored according to the average brightness difference and the color information of the shadow texel.

In one method, bright-side color information and dark-side color information of each texel in the diffuse reflection map are collected, and a bright-side color lookup table and a dark-side color lookup table are separately formed according to the bright-side color information and the dark-side color information. Further, the bright-side color information in the bright-side color lookup table may be converted into a bright-side average color, and the dark-side color information in the dark-side color lookup table may be converted into a dark-side average color according to a transparency value of each pixel in the bright-side color lookup table and the dark-side color lookup table, to form a bright-side average color lookup table and a dark-side average color lookup table. In addition, multi-level downsampling may be separately performed on the bright-side color lookup table and the dark-side color lookup table, so as to acquire a bright-side average color map set and a dark-side average color map set. Then, according to spatial coordinate information of each shadow texel in the diffuse reflection map, the bright-side average color lookup table and the dark-side average color lookup table are separately searched for bright-side average color information and dark-side average color information that are corresponding to the spatial coordinate information and that are not zero. In a case in which corresponding average color information is not found, a query may be performed on the bright-side average color map set and/or the dark-side average color map set according to the spatial coordinate information, and at least one piece of bright-side average color information and dark-side average color information that are corresponding to each shadow texel necessarily exist. Finally, the restoration color information may be determined according to the bright-side average color information, the dark-side average color information, and the color information of the shadow texel, and the color of the shadow texel is restored based on the restoration color information.

Another method for acquiring the average brightness difference is: extracting an edge in a shadow map by using an edge extraction algorithm, and determining a bright-part region and a dark-part region in the diffuse reflection map by using an edge point as a center point; and collecting a bright-part average color of the bright-part region and a dark-part average color of the dark-part region, and determining an average brightness difference according to the bright-part average color and the dark-part average color, where the average brightness difference may be stored in a four-dimensional lookup table to form an average color lookup table. Further, the average color lookup table may be downsampled for multiple times to acquire an average color map set. Finally, the average brightness difference corresponding to the shadow texel may be queried in the average color lookup table or the average color map set according to a spatial position coordinate and dark-part luminance information of the shadow texel in the diffuse reflection map, and the restoration color information is determined according to the average brightness difference and the color information of the shadow texel, so as to restore the color of the shadow texel according to the restoration color information.

On one hand, the technical solutions of the embodiments of this application improve color restoration efficiency and quality. On the other hand, the technical solutions do not affect a color of a texel in a non-shadow region of a map, and avoid a problem such as a loss of map details, a change of hue, a color overflow, and existence of a color lump. Therefore, it is ensured that a model generated according to a map may be applied to a scenario of any illumination condition, and a picture effect and user experience are further improved.

The image processing method provided in the embodiments of this application may be performed by the server, and correspondingly, an image processing apparatus may be disposed in the server. However, in another embodiment of this application, the terminal device may perform the image processing method provided in this embodiment of this application.

Figure 2A:
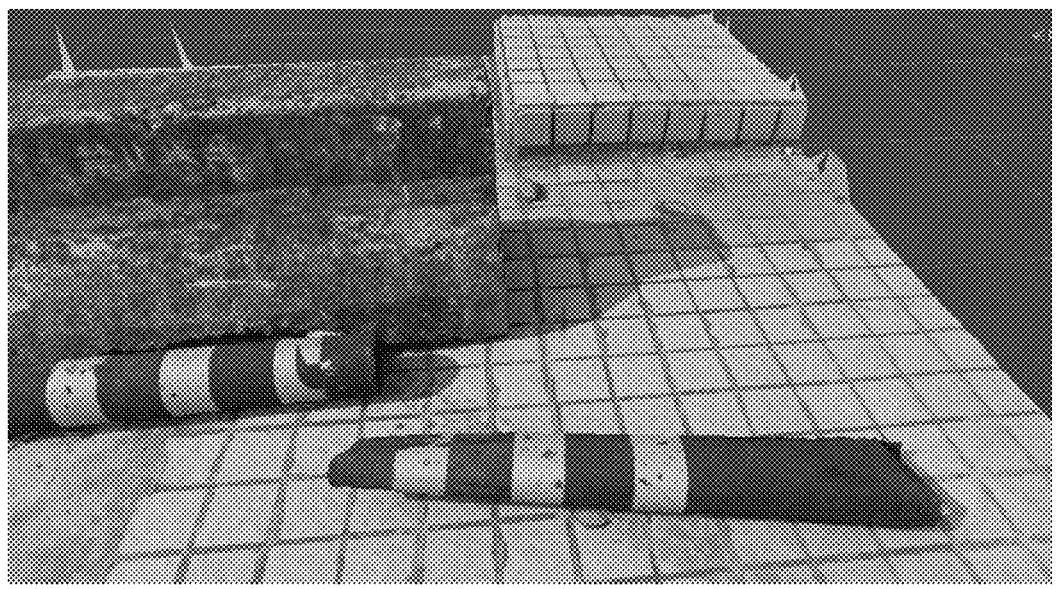
FIG. 2A and FIG. 2B are schematic diagrams of an interface for processing a model texture in a related art.
Figure 2B:
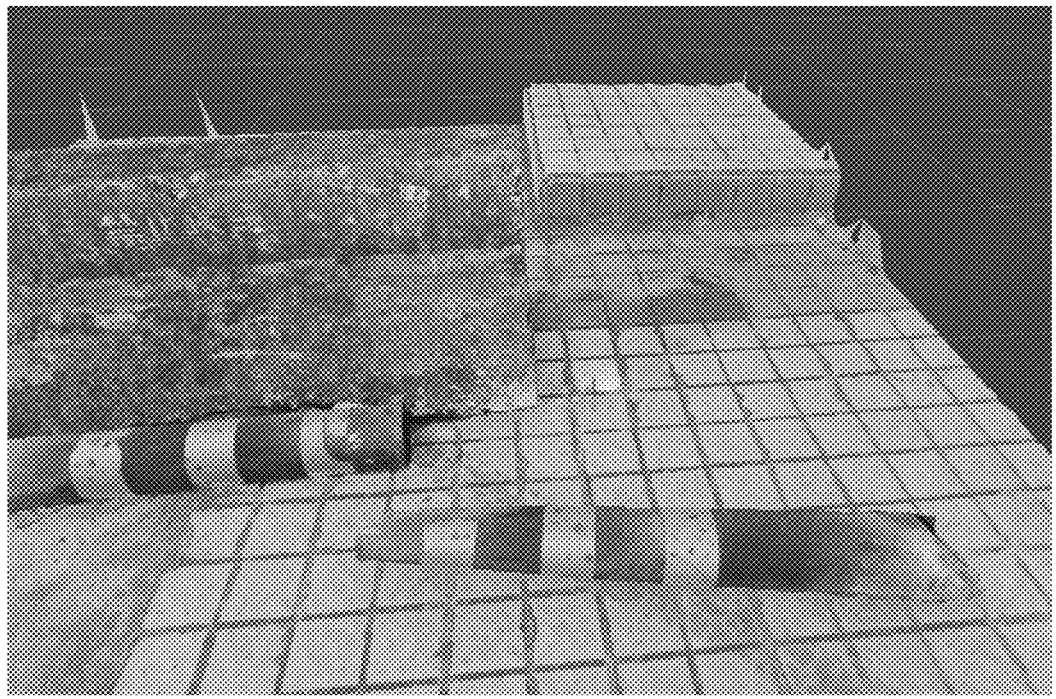

In a related technology in the art, to remove direct light illumination, a tool Agisoft Texture Delighting is generally used for processing, but generally, a problem such as a loss of map details, a change of hue, a color overflow, and existence of a color lump occurs. FIG. 2A and FIG. 2B show schematic diagrams of a model texture acquired by processing the model texture. FIG. 2A shows an original model texture not undergoing direct light illumination, and it can be seen that there is a shadow at a backlight of an object (as shown by an ellipse-like mark in the figure). FIG. 2B shows a model texture after direct light illumination is removed by using the tool Agisoft Texture Delighting. Although the shadow can be reduced after processing by the tool, there is still a residual shadow (as shown by the ellipse-like mark in the figure), the texture of the shadow part has color lumps, and the hue and color of the cone column also change from the hue and color of the original photo.

In view of a problem in a related technology, an embodiment of this application provides an image processing method. The image processing method can remove a shadow from a diffuse reflection map, and ensure that a model generated based on the shadow-removed diffuse reflection map can be used in a scenario of any illumination condition.

Figure 3:
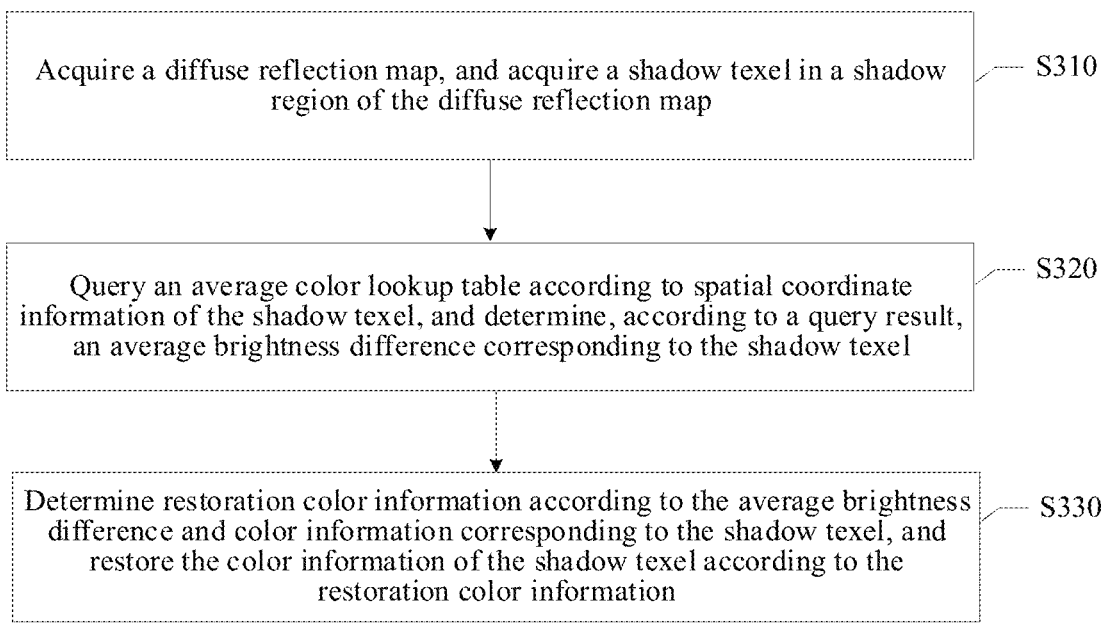
FIG. 3 is a schematic flowchart of an image processing method according to an embodiment of the present disclosure.

FIG. 3 is a schematic flowchart of an image processing method according to an embodiment of the present disclosure. The image processing method may be performed by a server, and the server may be the server 103 shown in FIG. 1. Referring to FIG. 3, the image processing method includes at least steps S310 to S330, which are described in detail in the following:

Step S310. Acquire a diffuse reflection map, and acquire a shadow texel in a shadow region of the diffuse reflection map.

In an embodiment of this application, after multiple photos at different angles of the same scenario are acquired, three-dimensional modeling may be performed according to the multiple photos by using a 3D modeling technology based on photogrammetry. In a modeling process, first, corresponding three-dimensional model information with a vertex color may be acquired according to a photo, where the three-dimensional model information with a vertex color is point cloud information that includes color information, and after the point cloud information that includes color information is acquired, texture map mapping may be performed by using graphic software to generate a texture map. Specifically, a three-dimensional graphic interface of any programmable pipeline may be invoked, a model is rendered on a rendering target in a standard rasterization manner, and vertex coordinates of the model are set to UV coordinates of texture map mapping by using a vertex shader, so as to implement texture map transfer. The UV coordinates are short for UV texture map coordinates. All image files are each a two-dimensional plane, a horizontal direction is U, and a vertical direction is V. Any pixel on the image may be located by using a two-dimensional UV coordinate system of the plane.

The texture map is a map used for expressing information such as model surface diffuse reflection, a normal, and an object space position. Each map is mapped and stored in a form of UV coordinates of the model. In this embodiment of this application, the texture map includes a diffuse reflection map, a position map, a normal map, and a shadow map. Further, the texture map may further include an ambient occlusion map and a bent normal map. When the map is being transferred, a diffuse reflection map, a position map, and a normal map are used as examples. After color information, an object spatial position, and normal information may be calculated in a vertex shader, a GPU performs linear interpolation during rasterization, rendering to a corresponding rendering target of the diffuse reflection map, the position map, and the normal map, and exports the diffuse reflection map, the position map, and the normal map for use by using graphic software.

Further, for direct light, a direction of the direct light may be specified in the graphic software, a light source is used as a viewpoint, and a depth information bitmap is acquired by using an orthogonal projection rendering model. The direction of the direct light in the graphic software may be specified in two manners. In a first manner, an origin and a projection point may be specified in the model, and the direction of the direct light may be acquired by means of calculation according to the information of the origin and the projection point. In a second manner, the photographing longitude and latitude and time may be measured by using an instrument, so that the graphic software can acquire the direction of the direct light by means of calculation according to the longitude and latitude and time.

After a depth information bitmap is acquired, spatial coordinates of an object in which a pixel is located may be acquired from the pixel shader, and coordinates corresponding to the depth information bitmap are acquired by performing linear transformation processing on the spatial coordinates, and information in the depth information bitmap is acquired by comparing with a preset depth value, to obtain a shadow map. The shadow map is used for expressing whether the surface of the model can be directly irradiated by a specific light source. The shadow map may represent, by using different values, whether a texel is a shadow texel or a non-shadow texel. For example, the shadow map may be a map consisting of 0 and 1, where 0 represents a non-shadow texel and 1 represents a shadow texel. Similar to the diffuse reflection map, the position map, and the normal map, the shadow map is also transferred and stored by using UV coordinates.

In an embodiment of this application, when three-dimensional modeling is performed by using a three-dimensional modeling technology based on photogrammetry, a shadow exists in a photographed photo whether direct light generated by a light source that has a fixed light emission direction, such as the sun or a light lamp, or non-direct light emitted by a non-fixed light source, where shadows generated by the direct light are more common. To enable the model to be used in a scenario of any illumination condition, it is necessary to remove shadows generated by various types of light. In this embodiment of this application, shadow removal is implemented by restoring a color of a shadow texel in a shadow region in a diffuse reflection map. The following describes in detail how to restore the color of the shadow texel produced by direct light illumination.

In an embodiment of this application, when a diffuse reflection map is acquired, a position map, a normal map, and a shadow map that are corresponding to the diffuse reflection map may be acquired. First, it is necessary to determine a shadow texel in a shadow region of the diffuse reflection map, and then color restoration can be purposefully performed to remove a shadow from the image.

Figure 4:
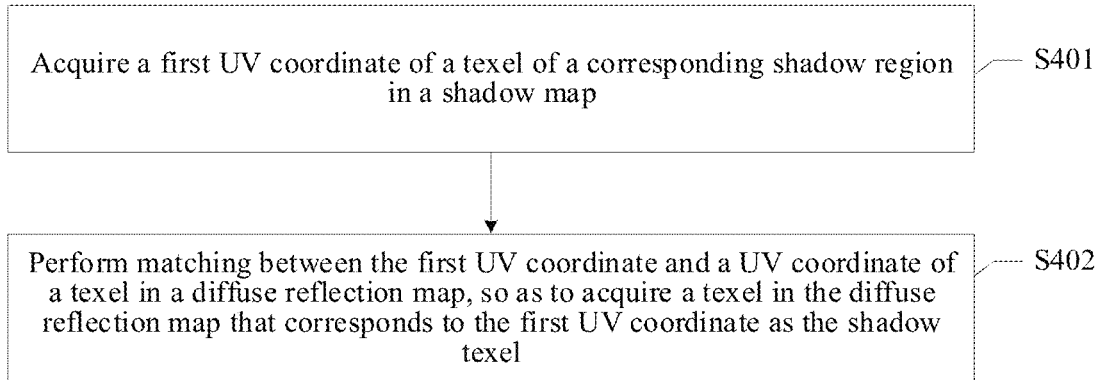
FIG. 4 is a schematic flowchart of determining a shadow texel according to an embodiment of the present disclosure.

FIG. 4 is a schematic flowchart of determining a shadow texel. As shown in FIG. 4, in step S401, acquire a first UV coordinate of a texel in a corresponding shadow map in a shadow region. In step S402, perform matching between the first UV coordinate and a UV coordinate of a texel in the diffuse reflection map, so as to acquire a texel in the diffuse reflection map that corresponds to the first UV coordinate as the shadow texel.

In step S401, a shadow map whose shadow value is represented by 0/1 is used as an example in the foregoing embodiment, where a texel whose shadow value is 1 is a texel in the shadow region, and UV coordinates of these texel are acquired from the shadow map, that is, the first UV coordinate. Because the diffuse reflection map and the shadow map are mapped and stored by using the UV coordinate, the texel in the diffuse reflection map and the shadow map that is corresponding to the same UV coordinate is corresponding to the same surface in the model. Therefore, after the first UV coordinate is acquired, a texel corresponding to the first UV coordinate in the diffuse reflection map may be searched for according to the first UV coordinate, where the texel is a shadow texel in a shadow region in the diffuse reflection map.

In step S320, query an average color lookup table according to spatial coordinate information of the shadow texel, and determine, according to a query result, an average brightness difference corresponding to the shadow texel.

In an embodiment of this application, after the shadow texel in the diffuse reflection map is determined, spatial coordinate information of each shadow texel may be acquired, corresponding average color information is searched for in the average color lookup table according to the spatial coordinate information of the shadow texel, an average brightness difference corresponding to the shadow texel is determined according to a query result, and the color of the shadow texel is restored according to the average brightness difference.

In an embodiment of this application, a shadow generated by direct light irradiation may be removed by using two different methods. For each removal method, specific content of a related average color lookup table is also different.

For a first method for removing a shadow generated by direct light irradiation, the involved average color lookup table includes a bright-side average color lookup table and a dark-side average color lookup table, and the following describes in detail how to acquire the bright-side average color lookup table and the dark-side average color lookup table.

In an embodiment of this application, before step S310, two lookup tables may be set: a bright-side lookup table and a dark-side lookup table, where the bright-side lookup table is used for storing spatial coordinate information and color information that are of non-shadow texels in the diffuse reflection map, and the dark-side lookup table is used for storing spatial coordinate information and color information of shadow texels in the diffuse reflection map. A lookup table (LUT) is a data structure that may be queried by using address information, and corresponding content corresponding to an address may be found by entering the address for table lookup.

Figure 5:
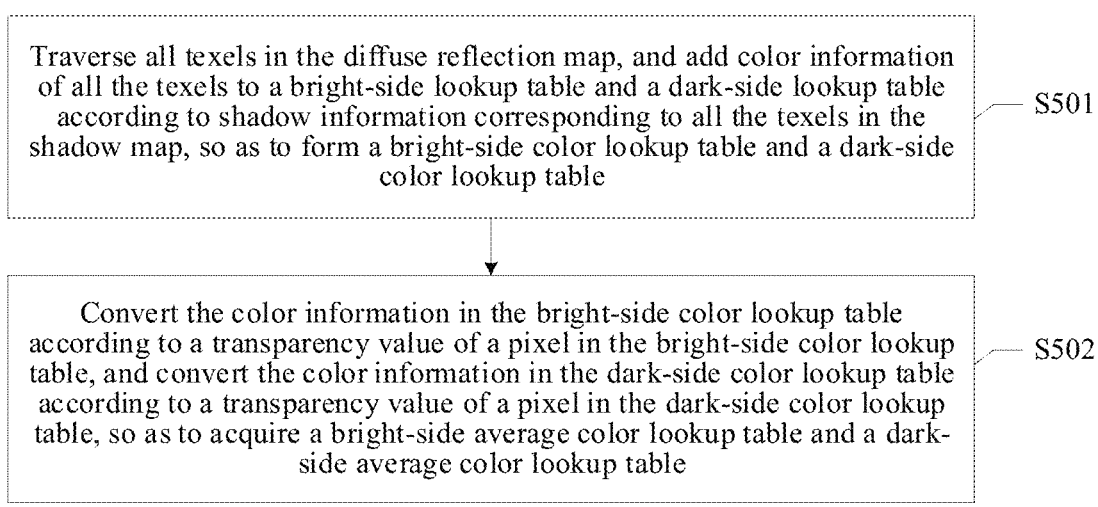
FIG. 5 is a schematic flowchart of acquiring a bright-side average color lookup table and a dark-side average color lookup table according to an embodiment of the present disclosure.

FIG. 5 is a schematic flowchart of acquiring a bright-side average color lookup table and a dark-side average color lookup table. As shown in FIG. 5, the procedure includes at least steps S501-S502. Specifically, in step S501, traverse all texels in the diffuse reflection map, and add color information of all the texels to a bright-side lookup table and a dark-side lookup table according to shadow information corresponding to all the texels in the shadow map, so as to form a bright-side color lookup table and a dark-side color lookup table.

In an embodiment of this application, to separately store color information of all texels in the diffuse reflection map in the bright-side lookup table and the dark-side lookup table, all the texels in the diffuse reflection map may be traversed and the color information of the texels may be added to pixel bits that are in the corresponding lookup table and that are corresponding to the spatial coordinate information of the texels. In this embodiment of this application, both the bright-side lookup table and the dark-side lookup table are five-dimensional lookup tables, where the five dimensions include three coordinate dimensions corresponding to texels in a spatial rectangular coordinate system in the diffuse reflection map, including X-axis coordinates, Y-axis coordinates, and Z-axis coordinates, and further includes a longitude and a latitude of a normal corresponding to each texel. The position information and the normal information of the texels in the spatial rectangular coordinate system may be calculated in a vertex shader according to vertex coordinates of each triangle surface of a model, and are transferred to the position map and the normal map when the maps are transferred.

In an embodiment of this application, when color information of each texel in the diffuse reflection map is added to the bright-side lookup table or the dark-side lookup table, spatial coordinate information of each texel may be first acquired according to a UV coordinate of the texel, where the spatial coordinate information is the same as a dimension of the lookup table, and also includes position coordinates (X, Y, Z) and normal coordinates (longitude, latitude). In addition, shadow information of each texel may be acquired according to a UV coordinate of each texel; whether a lookup table for storing the texel color information is a bright-side lookup table or a dark-side lookup table is determined according to the shadow information of the texel, and a pixel position for storing the color information is determined in the determined lookup table according to the spatial coordinate information of the texel; and finally, the color information of the texel is added to the corresponding pixel position.

The color information stored in the lookup table is a color vector that includes four channels R, G, B, and A. When a transparency value of an a channel is 0, it indicates that the texel is not mapped to the model. When the transparency value of the a channel is 1, it indicates that the texel is mapped to the model. Considering that the collected model can only be an opaque object, the collected a channel value of the texel is 1. That is, when the color information of the texel is added to the lookup table, only the color information of the texel whose transparency value is 1 needs to be added. In this way, a calculation amount can be reduced, and data processing efficiency can be improved.

Figure 6:
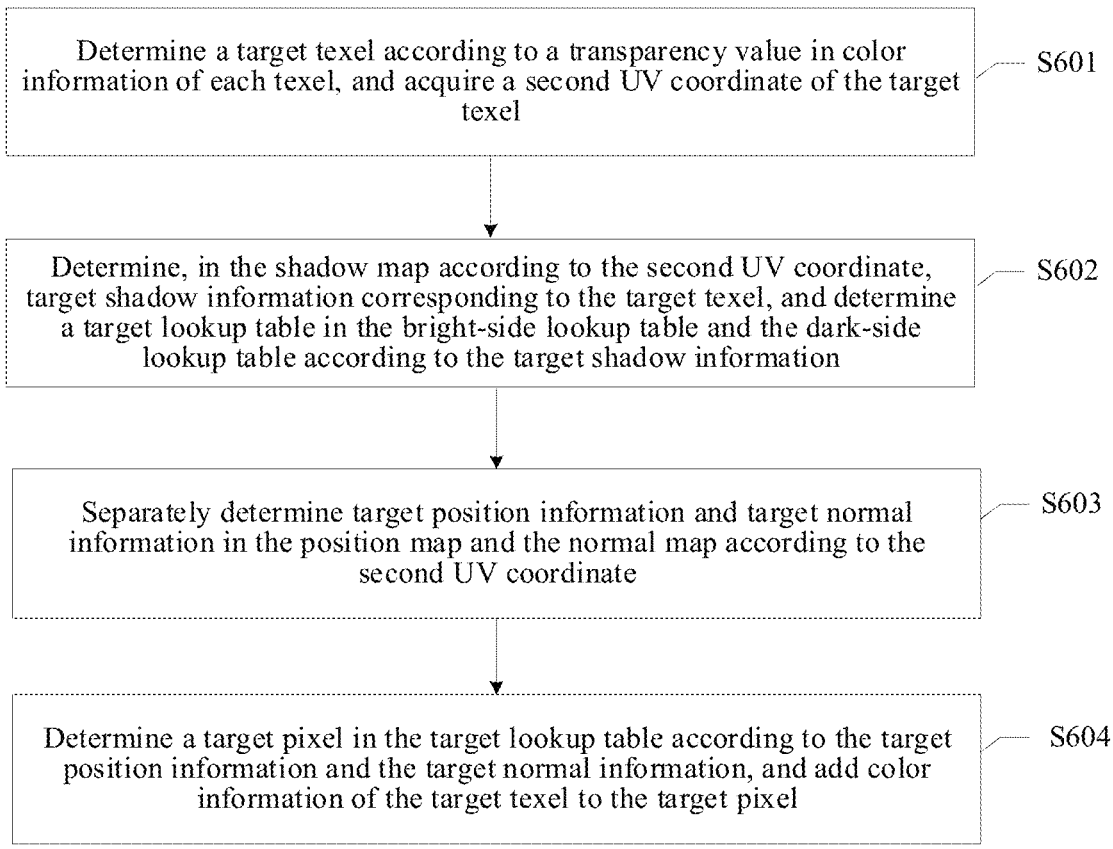
FIG. 6 is a schematic flowchart of acquiring a bright-side color lookup table and a dark-side color lookup table according to an embodiment of the present disclosure.

FIG. 6 is a schematic flowchart of acquiring a bright-side color lookup table and a dark-side color lookup table. As shown in FIG. 6, in step S601, determine a target texel according to a transparency value in color information of each texel, and acquire a second UV coordinate of the target texel. In step S602, determine, in the shadow map according to the second UV coordinate, target shadow information corresponding to the target texel, and determine a target lookup table in the bright-side lookup table and the dark-side lookup table according to the target shadow information. In step S603, separately determine target position information and target normal information in the position map and the normal map according to the second UV coordinate. In step S604, determine a target pixel in the target lookup table according to the target position information and the target normal information, and add color information of the target texel to the target pixel.

In step S601, the target texel is a texel whose transparency value is 1 in the color information. In step S602, the target shadow information of the target texel may be acquired by means of query in the shadow map according to the second UV coordinate. After the type of the target shadow information is determined, the target lookup table used for storing the color information of the texel may be determined according to the target shadow information. That is, when the target shadow information is that the target texel is a shadow texel, the dark-side lookup table is used as the target lookup table; and the bright-side lookup table is used as the target lookup table when the target shadow information indicates that the target texel is a non-shadow texel. In step S603, similar to the foregoing embodiment, the target position information and the target normal information that are corresponding to the target texel may be determined in the position map and the normal map according to the second UV coordinate of the target texel, where the target position information is position coordinates of the target texel in the spatial rectangular coordinate system, and the target normal information is the latitude and longitude of the normal corresponding to the target texel. In step S604, a pixel corresponding to the target texel may be determined in the bright-side lookup table or the dark-side lookup table according to the target position information and the target normal information, so that color information of the target texel may be added to the pixel. When the color information is added, the color information is still added in the form of a (R, G, B, A) vector. When the bright-side lookup table and the dark-side lookup table are at initial stages, a color value in each pixel is zero.

In step S502, convert color information in the bright-side color lookup table according to a transparency value of a pixel in the bright-side color lookup table, so as to obtain the bright-side average color lookup table; and convert color information in the dark-side color lookup table according to a transparency value of a pixel in the dark-side color lookup table, so as to obtain the dark-side average color lookup table.

In an embodiment of this application, after the color information of each texel in the diffuse reflection map is added to the bright-side lookup table and the dark-side lookup table to form the bright-side color lookup table and the dark-side color lookup table, the corresponding color information of the lookup table may be converted according to the transparency value of the color information in the bright-side color lookup table and the transparency value of the color information in the dark-side color lookup table, to form the bright-side average color lookup table and the dark-side average color lookup table.

Figure 7:
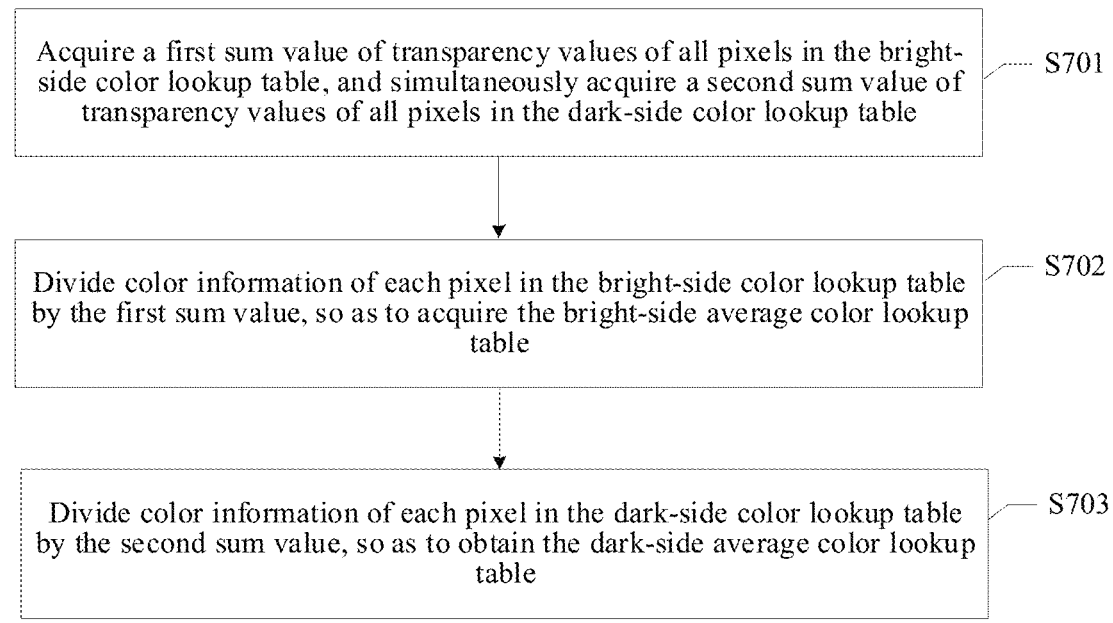
FIG. 7 is a schematic flowchart of constructing a bright-side average color lookup table and a dark-side average color lookup table according to an embodiment of the present disclosure.

FIG. 7 is a schematic flowchart of constructing a bright-side average color lookup table and a dark-side average color lookup table. As shown in FIG. 7, in step S701, acquire a first sum value of transparency values of all pixels in the bright-side color lookup table, and simultaneously acquire a second sum value of transparency values of all pixels in the dark-side color lookup table; in step S702, divide color information of each pixel in the bright-side color lookup table by the first sum value, so as to acquire the bright-side average color lookup table; and in step S703, divide color information of each pixel in the dark-side color lookup table by the second sum value, so as to obtain the dark-side average color lookup table.

In an embodiment of this application, the bright-side average color and the dark-side average color corresponding to the shadow texel need to be acquired to calculate the average brightness difference. However, for the same texel, a corresponding bright-side average color and dark-side average color may not be found in both the bright-side average color lookup table and dark-side average color lookup table. Therefore, after the bright-side color lookup table and dark-side color lookup table are acquired, multi-level downsampling may be separately performed on the bright-side color lookup table and the dark-side color lookup table to acquire a bright-side average color map set and a dark-side average color map set, the bright-side average color map set including multiple bright-side average color maps of different sizes, and the dark-side average color map set including multiple dark-side average color maps of different sizes.

For example, if a texel A is a shadow texel A, and a texel B is a non-shadow texel B, color information of the texel A is stored in the dark-side color lookup table, and color information of the texel B is stored in the bright-side color lookup table. That is, if no color information exists in a pixel that is in the bright-side color lookup table and that is corresponding to spatial coordinate information of the texel A, and no color information exists in a pixel that is in the dark-side color lookup table and that is corresponding to spatial coordinate information of the texel B, to acquire a bright-side average color corresponding to the texel A or acquire a dark-side average color corresponding to the texel B, the bright-side color lookup table and the dark-side color lookup table need to be downsampled. When downsampling is performed, color information of a larger region is processed, and downsampling is essentially a process of averaging color information. Therefore, by downsampling the bright-side color lookup table, color information of a non-shadow texel adjacent to the shadow texel A is counted, so as to obtain a bright-side average color corresponding to the spatial coordinate information of the shadow texel A. In addition, downsampling the dark-side color lookup table may count color information of a shadow texel adjacent to the non-shadow texel B, so as to obtain a dark-side average color corresponding to spatial coordinate information of the non-shadow texel B.

In an embodiment of this application, a downsampling process may be further understood as a convolutional process. In this embodiment of this application, convolution processing may be performed on an average color map of an $(N-1)^{th}$ level by using a five-dimensional convolution kernel that has an edge length of 2 pixels, to acquire an average color map of an $N^{th}$ level, until a minimum average color map is obtained, where N is a positive integer, and when N=1, an average color map of the 0th level is a bright-side color lookup table or a dark-side color lookup table. In this embodiment of this application, when multi-level downsampling is performed on the bright-side color lookup table or the dark-side color lookup table, color information of each pixel in a convolution kernel coverage region may be directly added as new color information.

In an embodiment of this application, after the bright-side average color lookup table, the dark-side average color lookup table, the bright-side average color map, and the dark-side average color map are acquired, the bright-side average color and the dark-side average color corresponding to the texel may be acquired from the spatial coordinate information of the texel. An objective of this application is to remove the shadow in the diffuse reflection map, and therefore, only a shadow texel in the diffuse reflection map needs to be color restored.

When searching for the bright-side average color and the dark-side average color that are corresponding to the shadow texel, the spatial coordinate information of the shadow texel may be first acquired; then dark-side average color information that is corresponding to the spatial coordinate information of the shadow texel and whose value is not zero is searched for in the dark-side average color lookup table according to the spatial coordinate information of the shadow texel; and a level-by-level query may be performed, according to the spatial coordinate information of the shadow texel, from a low-level bright-side average color map to a high-level bright-side average color map in the bright-side average color map set, so as to acquire the bright-side average color information that is corresponding to the spatial coordinate information and whose value is not zero, and further, the average brightness difference is determined according to the bright-side average color information and dark-side average color information.

In an embodiment of this application, when the dark-side average color information corresponding to the dark-side average color lookup table is determined according to the spatial coordinate information of the shadow texel, multidimensional linear interpolation processing may be performed on the dark-side average color information, so as to reduce a color gradient of an image and make a color smoother. When multidimensional linear interpolation processing is performed on the dark-side average color lookup table, specifically, pixels corresponding to the spatial coordinate information of the shadow texel in the dark-side average color lookup table may be used as original sampling points, and sampling is performed on each dimension, so as to obtain multiple sampling points including the original sampling points. For example, if the dark-side average color lookup table is a five-dimensional lookup table, 32 (25) sampling points may be acquired. Then, interpolation is successively performed on the multiple sampling points in five dimensions to calculate an average color offset of the interpolation points, and a volume of a hypercube of the average color offset is used as a weight, where a total volume of the hypercube is 1; and finally, the dark-side average color information acquired by performing multidimensional linear interpolation processing may be acquired by weighted summation on the average color offset according to the volume of the hypercube.

In an embodiment of this application, after the average brightness difference is determined according to the bright-side average color information and the dark-side average color information, because the bright-side average color information and the dark-side average color information are color information that includes (R, G, B, A) four-channel color values, when the color is restored, only color values of three channels R, G, and B need to be restored. Therefore, a bright-side RGB vector may be first acquired from the bright-side average color information, and a dark-side RGB vector is acquired from the dark-side average color information, and then the bright-side RGB vector is divided by the dark-side RGB vector to acquire the average brightness difference.

In a second method for removing a shadow generated by direct light illumination, the involved average color lookup table is a lookup table formed according to the average brightness difference, and how to acquire the average color lookup table is described in detail below.

Figure 8:
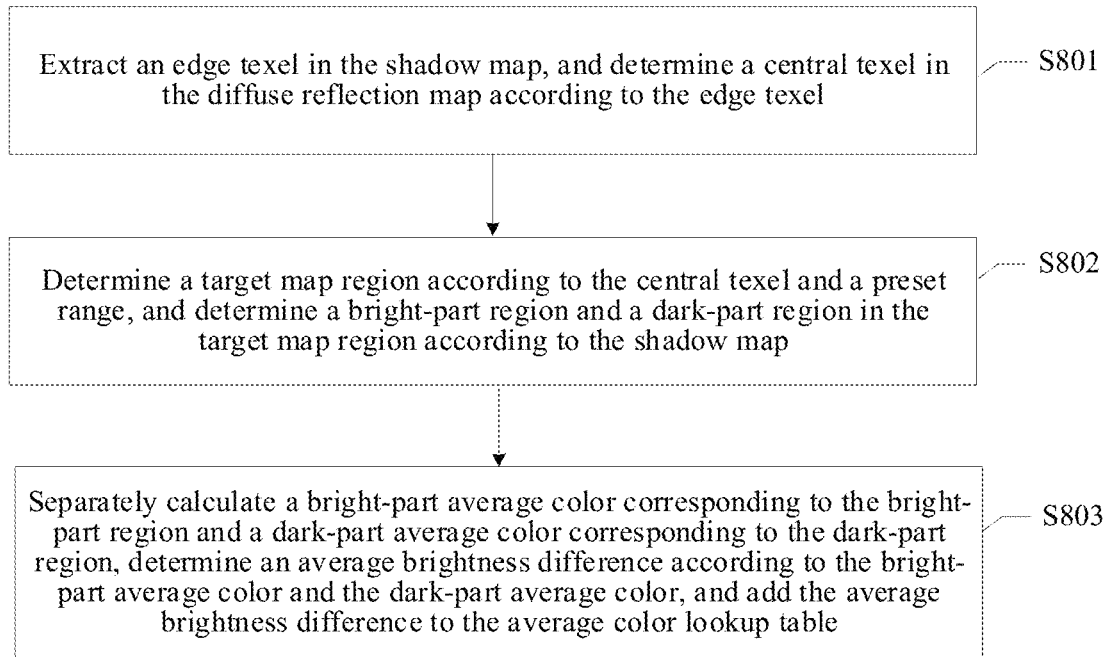
FIG. 8 is a schematic flowchart of forming an average color lookup table according to an embodiment of the present disclosure.

In an embodiment of this application, before step S310, a shadow map and a diffuse reflection map may be processed to acquire an average color lookup table. FIG. 8 is a schematic flowchart of forming an average color lookup table. As shown in FIG. 8, the procedure includes at least steps S801-S803. Specifically, in step S801, extract an edge texel in the shadow map, and determine a central texel in the diffuse reflection map according to the edge texel.

In an embodiment of this application, edge extraction may be performed on the shadow map based on an edge extraction algorithm. Specifically, when an edge of the shadow map is extracted, neighborhood convolution may be performed on the shadow map by using a horizontal direction template and a vertical direction template, to acquire an edge texel. The horizontal direction template is used for detecting a horizontal edge based on the texel in the shadow map, and the vertical direction template is used for detecting a vertical edge based on the texel in the shadow map. After a horizontal edge detection result and a vertical edge detection result corresponding to the same texel are acquired, a larger value of the two or a sum of the two may be used for acquiring a detection value. Finally, the detection value is compared with a preset threshold. If the detection value is greater than or equal to the preset threshold, it indicates that the texel is an edge texel.

In an embodiment of this application, after the edge texel in the shadow map is acquired, a UV coordinate of the edge texel may be acquired as a third UV coordinate. Because both the diffuse reflection map and the shadow map are mapped and stored by using the UV coordinate, a texel corresponding to the third UV coordinate may be determined in the diffuse reflection map according to the third UV coordinate, and the texel is used as the central texel to collect a subsequent average color.

In step S802, determine a target map region according to the central texel and a preset range, and determine a bright-part region and a dark-part region in the target map region according to the shadow map.

In an embodiment of this application, after the central texel is determined, a region in a preset range that is centered on the central texel and that is in the diffuse reflection map may be determined as a target map region. The preset range may be set according to an actual requirement, for example, may be set to 64×64 or 80×80. This is not specifically limited in this embodiment of this application.

Further, a bright-part region and a dark-part region may be determined in the target map region according to the position information of the shadow texel and the non-shadow texel in the shadow map. Specifically, first, a fourth UV coordinate of each texel in the target map region may be acquired, and then shadow information of each texel in the target map region is determined according to the fourth UV coordinate and the shadow map of each texel in the target map region. If the shadow information of the texel corresponding to the fourth UV coordinate is that the texel is a non-shadow texel, the texel corresponding to the fourth UV coordinate in the target map region is a texel in the bright-part region; if the shadow information of the texel corresponding to the UV coordinate is that the texel is a shadow texel, the texel corresponding to the UV coordinate in the target map region is a texel in the dark-part region. That is, a region formed by texels whose shadow information is non-shadow texels and whose spatial coordinates are adjacent to each other is used as a bright-part region, and a region formed by texels whose shadow information is shadow texels and whose spatial coordinates are adjacent to each other is used as a dark-part region.

In an embodiment of this application, when the bright-part region and the dark-part region are determined in the target map region, because mapping of texels in the map is not necessarily continuous and a case in which the mapping is close in the map but the mapped surfaces are far away may exist. In this embodiment of this application, whether position mapping and normal mapping are continuous may further be determined according to the position information and the normal information of the texels in the target map region, and a discontinuous texel is filtered. In this way, continuity of texels in the bright-part region and the dark-part region can be improved, and calculation accuracy can be improved.

In step S803, separately calculate a bright-part average color corresponding to the bright-part region and a dark-part average color corresponding to the dark-part region, determine an average brightness difference according to the bright-part average color and the dark-part average color, and add the average brightness difference to the average color lookup table.

Figure 9:
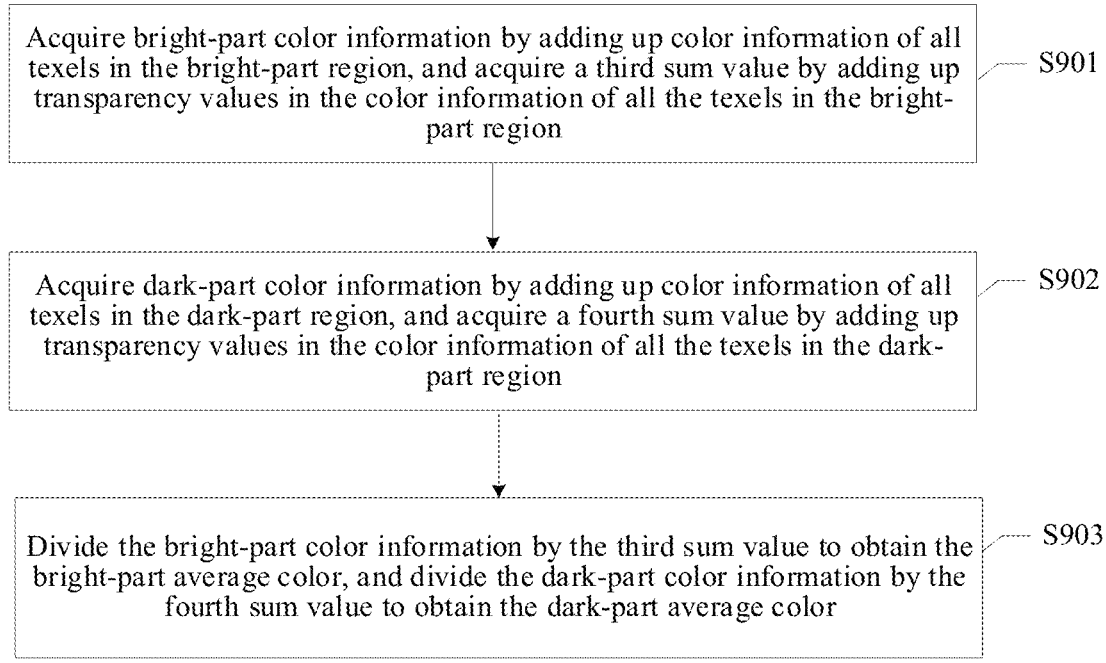
FIG. 9 is a schematic flowchart of calculating a bright-part average color and a dark-part average color according to an embodiment of the present disclosure.

In an embodiment of this application, after the bright-part region and the dark-part region in the target map region are acquired, a bright-part average color may be determined according to the color information of each texel in the bright-part region, and a dark-part average color is determined according to the color information of each texel in the dark-part region. FIG. 9 is a schematic flowchart of calculating a bright-part average color and a dark-part average color. As shown in FIG. 9, in step S901, acquire bright-part color information by adding up color information of all texels in the bright-part region, and acquire a third sum value by adding up transparency values in the color information of all the texels in the bright-part region; in step S902, acquire dark-part color information by adding up color information of all texels in the dark-part region, and acquire a fourth sum value by adding up transparency values in the color information of all the texels in the dark-part region; and in step S903, divide the bright-part color information by the third sum value to obtain the bright-part average color, and divide the dark-part color information by the fourth sum value to obtain the dark-part average color.

In an embodiment of this application, after the bright-part average color and the dark-part average color are acquired, a bright-part RGB vector in the bright-part average color and a dark-part RGB vector in the dark-part average color are acquired, and then an average brightness difference is acquired by dividing the bright-part RGB vector by the dark-part RGB vector. After the average brightness difference is acquired, an average brightness difference corresponding to each central texel may be added to the average color lookup table, where the average color lookup table is a four-dimensional color lookup table, four dimensions of the average color lookup table are respectively spatial position coordinates (X, Y, Z) of an object corresponding to each central texel and a color average value of a dark-part average color corresponding to each central texel in a diffuse reflection map. When the average brightness difference corresponding to the central texel is added to the average color lookup table, a corresponding pixel is determined in the average color lookup table according to the spatial position coordinates of the object corresponding to the central texel and the average color value of the dark-part average color corresponding to the central texel, and then the average brightness difference corresponding to the central texel is added to the pixel. The average color value of the dark-part average color is an average value of color values of three channels R, G, and B in the dark-part average color.

In an embodiment of this application, the average color lookup table provides data support for subsequent calculation of restoration color information. However, the average color lookup table does not have a corresponding average brightness difference corresponding to each shadow texel. Therefore, the average color lookup table may be down-sampled at multiple levels to acquire an average color map set corresponding to the average color lookup table, where the average color map set includes multiple average color maps of different sizes. A process of performing downsampling on the average color lookup table is the same as a method for performing downsampling on the bright-side color lookup table and the dark-side color lookup table in the foregoing embodiment, and details are not described herein again.

In an embodiment of this application, to restore the color information of the shadow texel in the diffuse reflection map, after all the shadow texels in the diffuse reflection map are determined, spatial position coordinates of each shadow texel are acquired according to the position map, the average color value of the dark-side average color corresponding to each shadow texel is acquired, and then an average brightness difference corresponding to the shadow texel is searched for in the average color lookup table according to the spatial position coordinates and the color average value of the dark-side average color. When there is no average brightness difference corresponding to the shadow texel in the average color lookup table, searching for the average color map from a low-level average color map to a high-level average color map in the average color map set according to the spatial position coordinates and the dark-part average color, until the corresponding average brightness difference is found, where a size of the low-level average color map is greater than that of the high-level average color map, and a highest-level average color map may be a matrix of 1×1×1×1.

In an embodiment of this application, when the average color lookup table is queried according to the spatial position coordinates of the shadow texel and the average color value of the dark-part average color, multidimensional linear interpolation may be performed on the average color information, so as to improve color smoothness and reduce a gradient of an image color. Similar to the method for performing multidimensional linear interpolation processing on the dark-side average color lookup table in the foregoing embodiment, when multidimensional linear interpolation processing is performed on the average color lookup table, specifically, pixels corresponding to the spatial position coordinate of the shadow texel and the average color value of the dark-part average color in the average color lookup table may be used as original sampling points, and sampling is performed on each dimension, so as to obtain multiple sampling points including the original sampling points. For example, if the average color lookup table is a four-dimensional lookup table, 16 (24) sampling points may be acquired. Then, interpolation is successively performed on the multiple sampling points in four dimensions to calculate an average brightness difference offset of the interpolation points, and a volume of a hypercube corresponding to the average brightness difference offset is used as a weight, where a total volume of the hypercube is 1; and finally, the average brightness difference information acquired by performing multidimensional linear interpolation processing may be acquired by weighted summation on the average color offset according to the volume of the hypercube.

In step S330, determine restoration color information according to the average brightness difference and color information corresponding to the shadow texel, and restore the color information of the shadow texel according to the restoration color information.

In an embodiment of this application, after the average brightness difference corresponding to the shadow texel is acquired, color restoration may be performed according to the average brightness difference and the color information of the shadow texel according to the first method or the second method for removing direct light illumination. Specifically, the average brightness difference may be multiplied by the RGB vector in the color information of the shadow texel, so as to acquire the restoration color information, and the color of the shadow texel can be restored according to the restoration color information.

In an embodiment of this application, after the color of the shadow texel is restored according to the method in the foregoing embodiment, blur processing may be further performed on a junction between the shadow texel and the non-shadow texel in the diffuse reflection map, that is, a bright-dark junction, to eliminate a problem of color inconsistency at the junction. As an example, in this embodiment of this application, blur processing may be performed by using methods such as Gaussian filtering, median filtering, bilateral filtering, and mean filtering.

According to the image processing method in this embodiment of this application, the average brightness difference may be determined according to the bright-side average color information and the dark-side average color information that are corresponding to the shadow texel, and the color information of the shadow texel may be restored according to the average brightness difference, or an average brightness difference is calculated according to the bright-part average color and the dark-part average color in the diffuse reflection map that are corresponding to the central texel corresponding to the edge texel in the shadow map, and the color information of the shadow texel can be restored according to the average brightness difference, so as to effectively remove the shadow generated by direct light illumination, and avoid a problem of a loss of map details, a change of hue, a color overflow, and occurrence of a color lump that occur in another place in the image, so that a visual effect of the model is better, and can be used in a scenario of any illumination condition, for example, may be widely used in a real-time rendering application such as a game or 3D interactive experience.

Figure 11:
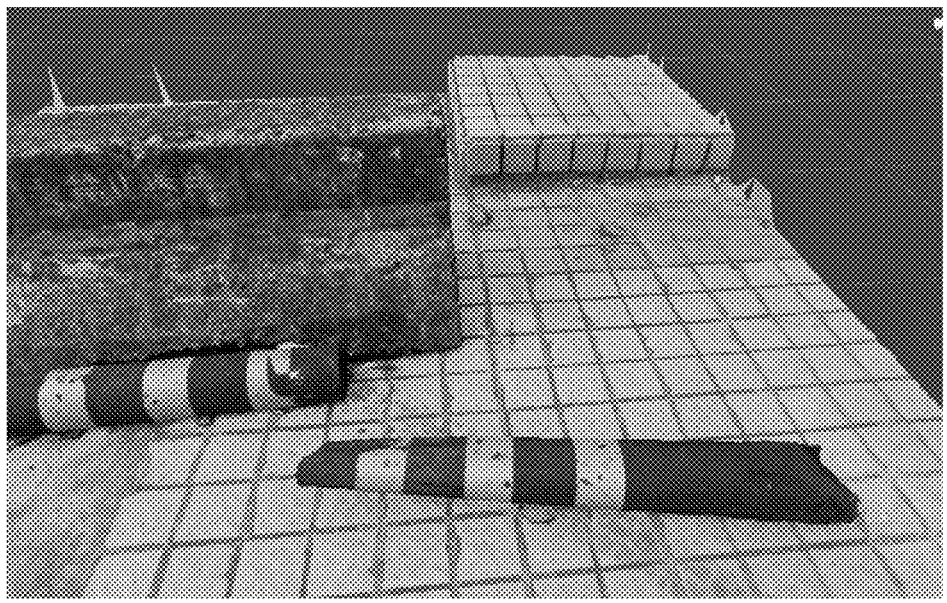
FIG. 11 is a schematic diagram of an interface for removing a shadow from a model according to an embodiment of the present disclosure.

In addition, it is convenient to collect and make model materials from an actual scenario, so that user experience is more real and better. FIG. 11 is a schematic diagram of an interface for removing a shadow in a model according to the image processing method in the present disclosure. As shown in FIG. 11, compared with FIG. 2A and FIG. 2B, a shadow removal effect is better and image quality is better according to the image processing method in this application.

In an embodiment of this application, in a first method for removing a shadow generated by direct light illumination, average color collection needs to be performed on each texel in a diffuse reflection map, then restoration color information is determined according to bright-side average color information and dark-side average color information corresponding to a shadow texel, and a color of the shadow texel is restored according to restoration color information. Therefore, the first method for removing a shadow is better for removing a shadow in diffuse reflection map with a relatively small quantity of colors. In a second method for removing a shadow generated by direct light illumination, an average color of a bright-part region and an average color of a dark-part region corresponding to a central texel in a diffuse reflection map are collected, then restoration color information is determined according to the average color of the bright-part region and the average color of the dark-part region, and a color of a shadow texel is restored according to restoration color information. Therefore, in the second method for removing a shadow in a diffuse reflection map with more colors, a shadow removal effect is better.

In an embodiment of this application, a shadow may be generated by direct light illumination, and a shadow may also be generated by non-direct light illumination. Next, how to remove a shadow generated by non-direct light illumination is described in detail.

In an embodiment of this application, when modeling is performed by using a rendering engine according to multiple photos, multiple maps corresponding to the model can be derived by using the rendering engine. When a light source in the photo is ambient light, in addition to a diffuse reflection map, a normal map, and a position map that are corresponding to the model, an ambient occlusion (AO) map and a bent normal map can be derived. A surface normal vector is a necessary parameter of a geometric model, and a bent normal is a new vector acquired after an original normal is modified. The surface normal vector points to an average direction of a current pixel that is not occluded by another object (or a geometric body element), that is, a main direction of light incoming. In general, the bent normal can be used for two purposes: changing the original normal and recording the main passing direction of light. In this way, during sampling of an environment map, sampled light can be calculated from a more optimized direction. The bent normal is used for performing normal rendering instead of using the original normal, so that a soft shadow effect similar to ambient occlusion can be acquired to a certain extent in a case of existence of only the normal.

Figure 10:
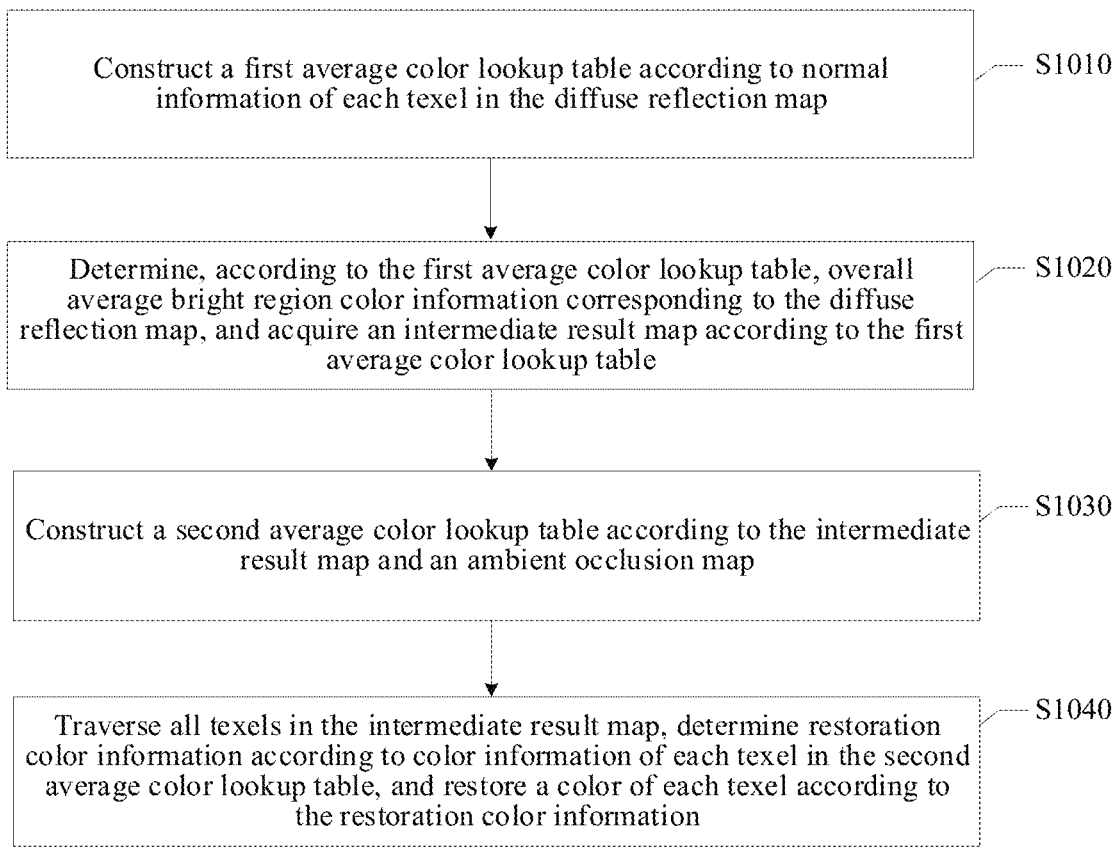
FIG. 10 is a schematic flowchart of removing a shadow generated by non-direct light illumination according to an embodiment of the present disclosure.

In an embodiment of this application, FIG. 10 is a schematic flowchart of removing a shadow generated by non-direct light illumination. As shown in FIG. 10, the procedure includes at least steps S1010-S1040. Specifically, in step S1010, construct a first average color lookup table according to normal information of each texel in the diffuse reflection map.

In an embodiment of this application, a lookup table may be constructed by using a latitude and a longitude of a normal as coordinates, and then color information of each texel in a diffuse reflection map is added to pixels corresponding to each texel in the lookup table, to form a first color lookup table. Specifically, first, a fifth UV coordinate of each texel of the diffuse reflection map may be acquired. Because both the diffuse reflection map and the normal map are stored by using UV coordinate mapping, normal information corresponding to the diffuse reflection map may be determined in the normal map according to the fifth UV coordinate. Then, a target pixel may be determined in the first color lookup table according to the acquired longitude and latitude in the normal information. Then it is determined whether a transparency value in color information of a texel having the fifth UV coordinate is 1; when the transparency value is 1, the color information of the texel is added to the target pixel; or when the transparency value is not 1, the color information of the texel is not processed. Finally, transparency values of all pixels in the first color lookup table that include the texel color information are collected, a fifth sum value is acquired by adding up the transparency values of all the pixels, and the color information of each pixel in the first color lookup table is divided by the fifth sum value, so as to acquire a first average color lookup table.

In step S1020, determine, according to the first average color lookup table, overall average bright region color information corresponding to the diffuse reflection map, and acquire an intermediate result map according to the first average color lookup table.

In an embodiment of this application, after the first average color lookup table is acquired, all pixels in the first average color lookup table may be traversed, and a degree of approaching 0.7 brightness of each pixel is calculated. Then, the degree of approaching 0.7 brightness of each pixel may be used as a weight, and pixels in the first average color lookup table may be processed, so as to acquire overall average bright region color information corresponding to a diffuse reflection map. When the degree of approaching 0.7 brightness of each pixel is calculated, calculation may be performed according to formula (1). Specifically, $$\omega = (1.0 - \text{Abs}(\text{Lumin}(RGB) - 0.7) \times 2)^3 \quad (1)$$

where $\omega$ is a weight, Abs is obtaining an absolute value, and Lumin(RGB) is a brightness value of an RGB vector of each pixel in the first average color lookup table.

In an embodiment of this application, the brightness value of the RGB vector may be acquired by converting an RGB color space into a YIQ color space, where Y is visibility of the color, that is, brightness. When the brightness value of the RGB vector is calculated, the color value of the RGB three channels may be converted according to a conversion ratio. Specifically, $Y = 0.299R + 0.587G + 0.114B$.

In an embodiment of this application, after a weight corresponding to each pixel in the first average color lookup table is acquired, color information of each pixel may be multiplied by a weight corresponding to the pixel to acquire weighted color information. Then, weighted color information corresponding to all pixels may be summed and averaged, so as to acquire overall average bright region color information. The overall average bright region color information may be acquired by means of calculation according to formula (2), which is specifically:

$$Q = \frac{1}{m}\sum_{i=1}^{m}(R, G, B, 1)_i \times \omega_i \quad (2)$$

where Q is the overall average bright region color information, i is any pixel in the first average color lookup table that has color information, and m is a quantity of pixels in the first average color lookup table that have color information, and is a weight corresponding to each pixel.

In an embodiment of this application, a weight corresponding to each pixel is a degree of approaching 0.7 brightness of the pixel, and a weight value may be used for making a weight of a color value of expected brightness higher, so as to achieve an overall goal of approaching expected average brightness, thereby recovering a shadow generated by non-direct light illumination.

In an embodiment of this application, all texels in a diffuse reflection map may be further traversed, and an intermediate result map is determined according to normal information of each texel and a first average color lookup table, where the intermediate result map includes processed average color information corresponding to each texel in the diffuse reflection map. The first average color lookup table stores only the average color information of the texel whose transparency value is 1. For another texel whose transparency value is not 1, there is no corresponding average color information in the first average color lookup table. Therefore, the first average color lookup table needs to be downsampled for multiple times, so as to acquire a first average color map set. The first average color map set includes multiple first average color maps of different sizes. By means of downsampling, it can be ensured that each texel in the corresponding diffuse reflection map has a corresponding average color.

When the intermediate result map is determined, first a sixth UV coordinate of each texel in the diffuse reflection map is acquired, then normal information corresponding to the texel in the normal map is searched according to the sixth UV coordinate, and then corresponding average color information is acquired from the first average color lookup table according to the normal information. If the average color information corresponding to the normal information cannot be acquired in the first average color lookup table, the first average color map set is searched from a low-level average color map to a high-level average color map according to the normal information until the average color information corresponding to the normal information is acquired. Finally, the acquired average color information corresponding to each texel may be processed to acquire processed average color information. When the average color information corresponding to each texel is processed, a first RGB vector in the average color information corresponding to the texel and a second RGB vector in the color information corresponding to the texel in the diffuse reflection map may be first acquired, and then the processed average color information is acquired by means of calculation according to formula (3). Further, the intermediate result map may be formed according to the processed average color information. Formula (3) is specifically:

$$P = (1.0f/V_1) \times V_2 \quad (3)$$

where P is processed color information, V1 is the first RGB vector, and V2 is the second RGB vector.

In step S1030, construct a second average color lookup table according to the intermediate result map and an ambient occlusion map.

In an embodiment of this application, ambient occlusion information and bent normal information may be used as coordinates to form a lookup table, and after weighting processing, color information of each texel in the intermediate result map is added to the lookup table to form the second average color lookup table. Both the ambient occlusion information and the bent normal information are floating points of a channel value, that is, the second average color lookup table is also a two-dimensional lookup table. Further, the first average color lookup table and the second average color lookup table may have the same size, for example, both are set to 64×32, or certainly may be set to different sizes. This is not specifically limited in this embodiment of this application.

In an embodiment of this application, when the second average color lookup table is formed, all texels in the intermediate result map are traversed, an ambient occlusion value corresponding to each texel is acquired according to a UV coordinate of the texel, and then the ambient occlusion value is used as a weight to perform weighting processing on the intermediate result corresponding to the corresponding texel. After the intermediate result acquired after the weighting processing corresponding to each texel in the intermediate result map is acquired, a transparency value in the intermediate result acquired after the weighting processing corresponding to each texel may be acquired, and then a sixth sum value is acquired by adding up transparency values corresponding to all texels. Then, the intermediate result acquired after the weighting processing corresponding to each texel is divided by the sixth sum value, so as to acquire average color information corresponding to each texel. Finally, the second average color lookup table may be acquired by adding the average color information corresponding to each texel to a corresponding pixel in the lookup table.

In an embodiment of this application, the second average color lookup table may be downsampled for multiple times to acquire a second average color map set, where the second average color map set includes multiple second average color maps of different sizes, and a method for downsampling the second average color lookup table is the same as the method for downsampling the bright-side color lookup table or the dark-side color lookup table, and details are not described herein again.

In step S1040, traverse all texels in the intermediate result map, determine restoration color information according to color information of each texel in the second average color lookup table, and restore a color of each texel according to the restoration color information.

In an embodiment of this application, the texels in the intermediate result map are traversed to acquire a UV coordinate of each intermediate result texel in the intermediate result map, and a query is performed on the ambient occlusion map and the bent normal map according to the UV coordinate, so as to acquire ambient occlusion information and bent normal information corresponding to each intermediate result texel. Then, the second average color information is acquired by querying the second average color lookup table according to the ambient occlusion information and the bent normal information of each intermediate result texel, and if no corresponding second average color information exists in the second average color lookup table, the second average color information corresponding to the intermediate result texel may be searched from a lower-level second average color map to a high-level second average color map in the second average color map set according to the ambient occlusion information and the bent normal information of the intermediate result texel, until the second average color information corresponding to the intermediate result texel is acquired.

In an embodiment of this application, after the second average color information corresponding to the intermediate result texel is acquired, restoration color information may be determined according to the second average color information, the color information of the intermediate result texel, and the overall average bright region color information. When the restoration color information is determined, an RGB vector in the color information of the intermediate result texel is first acquired, and then the restoration color information is acquired by means of calculation according to formula (4). Formula (4) is specifically as follows:

$$C = (1.0f/L) \times V_3 \times Q \qquad (4)$$

where C is the restoration color information, L is the second average color information, V3 is the RGB vector in the color information of the intermediate result texel, and Q is the overall average bright region color information.

In an embodiment of this application, because the intermediate result map is acquired by processing the texel in the diffuse reflection map, the intermediate result map corresponds to the texel in the diffuse reflection map. Therefore, after the restoration color information corresponding to the texel in the intermediate result map is acquired, color information of each texel in the diffuse reflection map may be replaced with the restoration color information corresponding to the texel in the intermediate result map, and a shadow generated by non-direct light illumination in the diffuse reflection map may be removed.

Figure 12A:
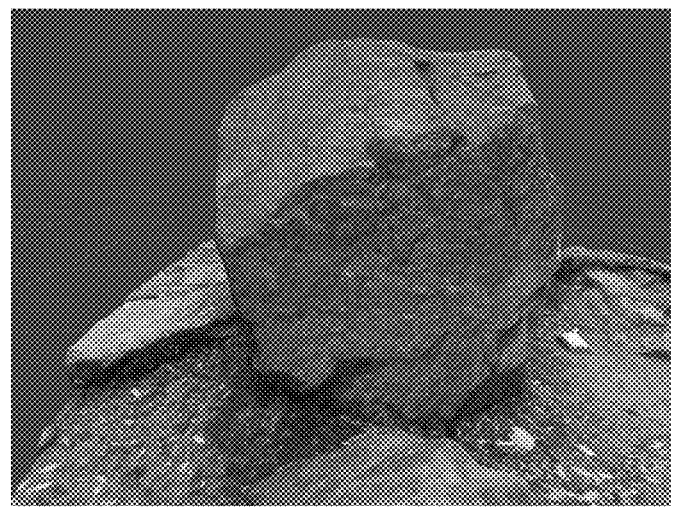
FIG. 12A to FIG. 12C are schematic diagrams of an interface before and after a non-direct light shadow is removed from a model according to an embodiment of the present disclosure.
Figure 12B:
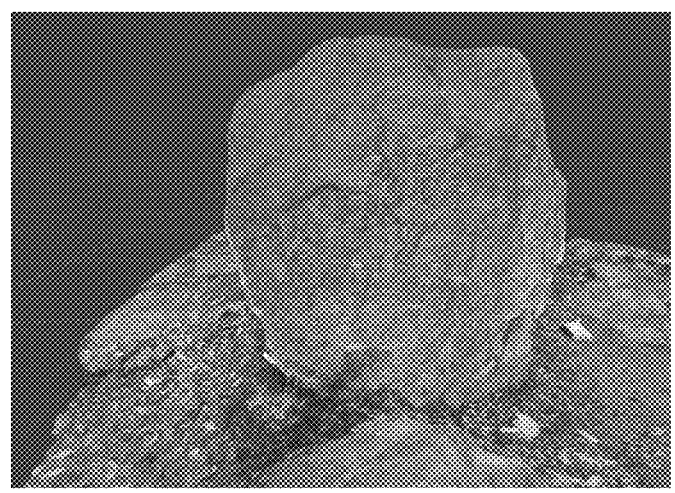
Figure 12C:
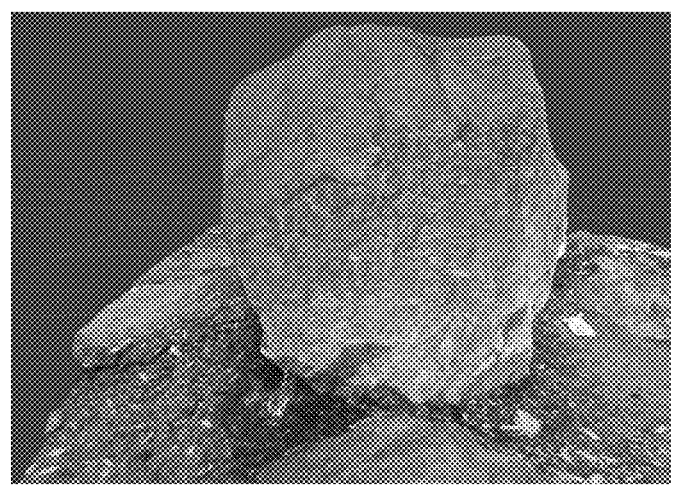

FIG. 12A to FIG. 12C show schematic diagrams of an interface before and after non-direct light shadow removal in a model. As shown in FIG. 12A, an image is an original model texture without shadow removal. As shown in FIG. 12B, an image is a model texture after shadow removal by using the Unity De-Lighting tool, where a moss color on a stone is distorted. After the image processing method in this embodiment of this application removes a shadow in the model, a moss color is not distorted, and image quality is relatively high, as shown in FIG. 12C.

In a case in which both direct light and non-direct light exist, because a function of the direct light is relatively strong and a function of the non-direct light is relatively weak, image processing may be performed only according to a method for removing a shadow generated by direct light illumination.

According to the image processing method in this embodiment of this application, on one hand, a shadow generated due to direct light illumination in a diffuse reflection map is removed by using two methods; on the other hand, a shadow generated due to non-direct light illumination in the diffuse reflection map is removed by using one method. This effectively avoids a problem in the related art that when a shadow is removed by using a known tool, a loss of map details, a change of hue, a color overflow, or occurrence of a color lump exists, and improves quality of the diffuse reflection map, so that a model with a coverage of the diffuse reflection map may be used in a scenario under any illumination condition, and a problem such as poor image quality and low user experience is not caused by a shadow.

The following describes apparatus embodiments of this application, and the apparatus embodiments can be used for performing the image processing method in the foregoing embodiments of this application. For details not disclosed in the apparatus embodiments of this application, refer to the foregoing embodiment of the image processing method of this application.

Figure 13:
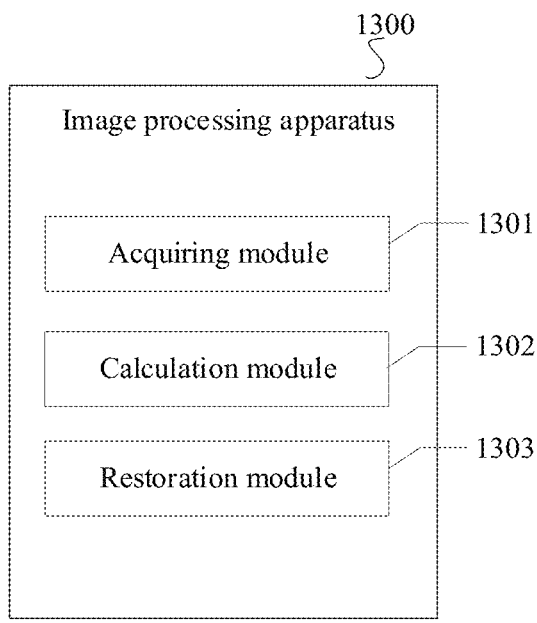
FIG. 13 is a block diagram of an image processing apparatus according to an embodiment of the present disclosure.

FIG. 13 schematically shows a block diagram of an image processing apparatus according to an embodiment of this application. The apparatus may be configured to perform a corresponding operation in the method provided in the embodiments of this application.

Referring to FIG. 13, an image processing apparatus 1300 according to an embodiment of this application includes an acquiring module 1301, a calculation module 1302, and a restoration module 1303.

The acquiring module 1301 is configured to acquire a diffuse reflection map, and acquire a shadow texel in a shadow region of the diffuse reflection map; the calculation module 1302 is configured to: query an average color lookup table according to spatial coordinate information of the shadow texel, and determine, according to a query result, an average brightness difference corresponding to the shadow texel; and the restoration module 1303 is configured to: determine restoration color information according to the average brightness difference and color information corresponding to the shadow texel, and restore the color information of the shadow texel according to the restoration color information.

In an embodiment of this application, the acquiring module 1301 is further configured to acquire a position map, a normal map, and a shadow map that are corresponding to the diffuse reflection map.

In an embodiment of this application, the acquiring module 1301 is specifically configured to acquire a first UV coordinate of a texel of a corresponding shadow region in the shadow map; and perform matching between the first UV coordinate and a UV coordinate of a texel in the diffuse reflection map, so as to acquire a texel in the diffuse reflection map that matches the first UV coordinate as the shadow texel.

In an embodiment of this application, the average color lookup table includes a bright-side average color lookup table and a dark-side average color lookup table; and the image processing apparatus 1300 further includes: a color lookup table forming module, configured to: before acquiring the shadow texel in the shadow region in the diffuse reflection map, traverse all texels in the diffuse reflection map, and add color information of all the texels to a bright-side lookup table and a dark-side lookup table according to shadow information corresponding to all the texels in the shadow map, so as to form a bright-side color lookup table and a dark-side color lookup table; an average color lookup table forming module, configured to convert color information in the bright-side color lookup table according to a transparency value of a pixel in the bright-side color lookup table, so as to obtain the bright-side average color lookup table; and convert color information in the dark-side color lookup table according to a transparency value of a pixel in the dark-side color lookup table, so as to obtain the dark-side average color lookup table.

In an embodiment of this application, both the bright-side lookup table and the dark-side lookup table are five-dimensional lookup tables, and the five-dimensional lookup table includes three coordinate dimensions of a texel in the diffuse reflection map in a spatial rectangular coordinate system and a longitude and a latitude of a normal corresponding to the texel.

In an embodiment of this application, the average color lookup table forming module is specifically configured to: acquire a first sum value of transparency values of all pixels in the bright-side color lookup table, and simultaneously acquire a second sum value of transparency values of all pixels in the dark-side color lookup table; divide color information of each pixel in the bright-side color lookup table by the first sum value, so as to acquire the bright-side average color lookup table; and divide color information of each pixel in the dark-side color lookup table by the second sum value, so as to obtain the dark-side average color lookup table.

In an embodiment of this application, the color lookup table forming module includes: a first coordinate acquiring unit, configured to: determine a target texel according to a transparency value in color information of each texel, and acquire a second UV coordinate of the target texel; a shadow information query unit, configured to: determine, in the shadow map according to the second UV coordinate, target shadow information corresponding to the target texel, and determine a target lookup table in the bright-side lookup table and the dark-side lookup table according to the target shadow information; a position information query unit, configured to: separately determine target position information and target normal information in the position map and the normal map according to the second UV coordinate; and a color adding unit, configured to: determine a target pixel in the target lookup table according to the target position information and the target normal information, and add color information of the target texel to the target pixel to form the bright-side color lookup table and the dark-side color lookup table.

In an embodiment of this application, the first coordinate acquiring unit is specifically configured to use a texel whose transparency value is 1 in the color information as the target texel.

In an embodiment of this application, the target position information is a position coordinate of the target texel in a spatial rectangular coordinate system, the target normal information is a longitude and a latitude of a normal corresponding to the target texel, and the target shadow information is used for indicating whether the target texel is the shadow texel.

In an embodiment of this application, the shadow information query unit is configured to: query the shadow map according to the second UV coordinate, to acquire the target shadow information, and determine a type of the target shadow information; use the dark-side lookup table as the target lookup table when the target shadow information indicates that the target texel is a shadow texel; and use the bright-side lookup table as the target lookup table when the target shadow information indicates that the target texel is a non-shadow texel.

In an embodiment of this application, the image processing apparatus 1300 further includes: a map set generation module, configured to: separately perform multi-level downsampling on the bright-side color lookup table and the dark-side color lookup table to acquire a bright-side average color map set and a dark-side average color map set, the bright-side average color map set including multiple bright-side average color maps of different sizes, and the dark-side average color map set including multiple dark-side average color maps of different sizes.

In an embodiment of this application, the calculation module 1302 includes: a dark-side average color acquiring unit, configured to determine, from the dark-side average color lookup table according to the spatial coordinate information of the shadow texel, dark-side average color information that is corresponding to the spatial coordinate information and whose value is not zero; a bright-side average color acquiring unit, configured to: perform, according to the spatial coordinate information, a level-by-level query from a lower-level bright-side average color map to a higher-level bright-side average color map in the bright-side average color map set, so as to acquire bright-side average color information that is corresponding to the spatial coordinate information and whose value is not zero; and an average brightness difference calculation unit, configured to determine the average brightness difference according to the bright-side average color information and the dark-side average color information.

In an embodiment of this application, the calculation module 1302 is further configured to: perform multidimensional linear interpolation processing on the dark-side average color lookup table in a case of determining the dark-side average color information.

In an embodiment of this application, the average brightness difference calculation unit is specifically configured to: acquire a bright-side RGB vector in the bright-side average color information and a dark-side RGB vector in the dark-side average color information; and divide the bright-side RGB vector by the dark-side RGB vector to acquire the average brightness difference.

In an embodiment of this application, the restoration module 1303 is specifically configured to multiply the average brightness difference by an RGB vector in the color information corresponding to the shadow texel to acquire the restoration color information.

In an embodiment of this application, the image processing apparatus 1300 further includes: a central texel determining module, configured to: extract an edge texel in the shadow map, and determine a central texel in the diffuse reflection map according to the edge texel; a bright-dark region determining module, configured to: determine a target map region according to the central texel and a preset range, and determine a bright-part region and a dark-part region in the target map region according to the shadow map; and an average brightness difference calculation module, configured to: separately calculate a bright-part average color corresponding to the bright-part region and a dark-part average color corresponding to the dark-part region, determine an average brightness difference according to the bright-part average color and the dark-part average color, and add the average brightness difference to the average color lookup table.

In an embodiment of this application, the central texel determining module is specifically configured to: perform neighborhood convolution on the shadow map by using a horizontal direction template and a vertical direction template, to acquire the edge texel; and acquire a third UV coordinate of the edge texel, and search the diffuse reflection map according to the third UV coordinate, so as to acquire the central texel.

In an embodiment of this application, the bright-dark region determining module is specifically configured to: acquire a fourth UV coordinate of each texel in the target map region, and determine, according to the fourth UV coordinate and the shadow map, shadow information corresponding to each texel in the target map region; and use, as the bright-part region, a region formed by texels whose shadow information is non-shadow texels and whose spatial coordinate information is adjacent, and use, as the dark-part region, a region formed by texels whose shadow information is shadow texels and whose spatial coordinate information is adjacent.

In an embodiment of this application, the average brightness difference calculation module is specifically configured to: acquire bright-part color information by adding up color information of all texels in the bright-part region, and acquire a third sum value by adding up transparency values in the color information of all the texels in the bright-part region; acquire dark-part color information by adding up color information of all texels in the dark-part region, and acquire a fourth sum value by adding up transparency values in the color information of all the texels in the dark-part region; and divide the bright-part color information by the third sum value to obtain the bright-part average color, and divide the dark-part color information by the fourth sum value to obtain the dark-part average color.

In an embodiment of this application, the average brightness difference calculation module is specifically configured to: acquire a bright-part RGB vector in the bright-part average color and a dark-part RGB vector in the dark-part average color; and divide the bright-part RGB vector by the dark-part RGB vector to acquire the average brightness difference.

In an embodiment of this application, the average color lookup table is a four-dimensional lookup table, and includes three dimensions of a spatial position coordinate of the central texel and an average color value of the dark-part average color.

In an embodiment of this application, the calculation module 1302 includes: an information acquiring unit, configured to: determine a spatial position coordinate of the shadow texel according to the position map, and simultaneously acquire an average color value of the dark-part average color corresponding to the shadow texel; and an information searching unit, configured to: query a corresponding average brightness difference in the average color lookup table according to the spatial position coordinate of the shadow texel and the average color value of the dark-part average color.

In an embodiment of this application, the information searching unit is specifically configured to query whether a corresponding average brightness difference exists in the average color lookup table according to the spatial position coordinate of the shadow texel and the average color value of the dark-part average color; and query, when no corresponding average brightness difference exists in the average color lookup table, a corresponding average brightness difference in an average color map set corresponding to the average color lookup table according to the spatial position coordinate of the shadow texel and the average color value of the dark-part region, the average color map set including multiple maps formed by performing multi-level downsampling on the average color lookup table.

In an embodiment of this application, the information searching unit is further configured to: perform multidimensional linear interpolation processing on the average color lookup table in a case of querying the average brightness difference.

In an embodiment of this application, the restoration module 1303 is configured to multiply the average brightness difference by an RGB vector in the color information corresponding to the shadow texel to acquire the restoration color information.

In an embodiment of this application, the image processing apparatus 1300 further includes an interface blurring module, configured to perform blur processing on an interface between the shadow texel and a non-shadow texel in the diffuse reflection map.

Figure 14:
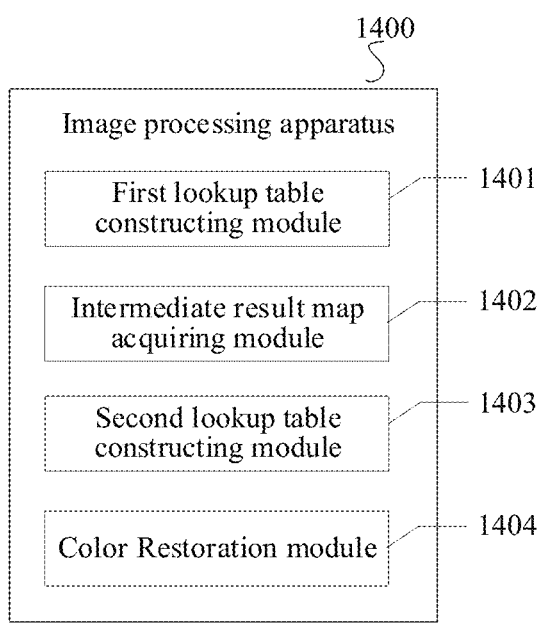
FIG. 14 is a block diagram of an image processing apparatus according to an embodiment of the present disclosure.

FIG. 14 schematically shows a block diagram of an image processing apparatus according to an embodiment of this application. The apparatus may be configured to perform a corresponding operation in the method provided in the embodiments of this application.

Referring to FIG. 14, an image processing apparatus 1400 according to an embodiment of this application includes a first lookup table constructing module 1401, an intermediate result map acquiring module 1402, a second lookup table constructing module 1403, and a color restoration module 1404.

The first lookup table constructing module 1401 is configured to construct a first average color lookup table according to normal information of each texel in the diffuse reflection map; the intermediate result map acquiring module is configured to: determine, according to the first average color lookup table, overall average bright region color information corresponding to the diffuse reflection map, and acquire an intermediate result map according to the first average color lookup table; the second lookup table constructing module is configured to construct a second average color lookup table according to the intermediate result map and an ambient occlusion map; and the color restoration module is configured to: traverse all texels in the intermediate result map, determine restoration color information according to color information of each texel in the second average color lookup table, and restore a color of each texel according to the restoration color information.

Figure 15:
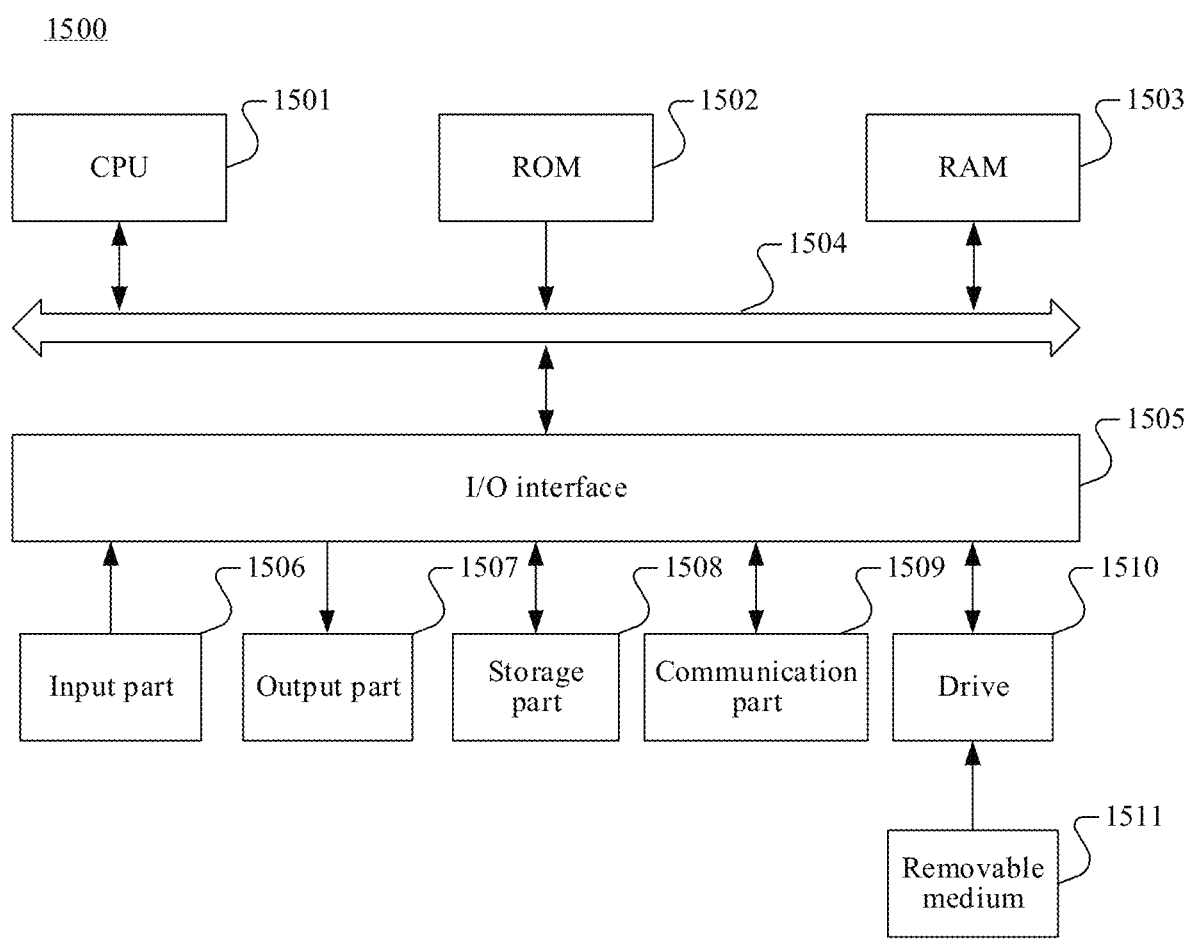
FIG. 15 is a schematic structural diagram of a computer system adapted for implementing an electronic device according to an embodiment of the present disclosure.

FIG. 15 shows a schematic structural diagram of a computer system adapted for implementing an electronic device according to an embodiment of this application.

The computer system 1500 of the electronic device shown in FIG. 15 is merely an example, and does not constitute any limitation on functions and use ranges of the embodiments of this application.

As shown in FIG. 15, the computer system 1500 includes a central processing unit (CPU) 1501, which may perform various suitable actions and processing based on a program stored in a read-only memory (ROM) 1502 or a program loaded from a storage part 1508 into a random access memory (RAM) 1503, to implement the image processing method described in the foregoing embodiments. The RAM 1503 further stores various programs and data required for system operations. The CPU 1501, the ROM 1502, and the RAM 1503 are connected to each other through a bus 1504. An input/output (I/O) interface 1505 is also connected to the bus 1504.

The following components are connected to the I/O interface 1505 includes an input part 1506 including a keyboard, a mouse, or the like; an output part 1507 including a cathode ray tube (CRT), a liquid crystal display (LCD), a speaker, or the like; a storage part 1508 including hard disk, or the like; and a communication part 1509 including a network interface card such as a local area network (LAN) card, a modem, or the like. The communication portion 1509 performs communication processing by using a network such as the Internet. A driver 1510 is also connected to the I/O interface 1505 as required. A removable medium 1511, such as a magnetic disk, an optical disc, a magneto-optical disk, or a semiconductor memory, is installed on the driver 1510 as required, so that a computer program read from the removable medium is installed into the storage part 1508 as required.

Particularly, according to the embodiments of this application, the processes described in the following by referring to the flowcharts may be implemented as computer software programs. For example, this embodiment of this application includes a computer program product, the computer program product includes a computer program carried on a computer-readable medium, and the computer program includes program code used for performing the methods shown in the flowcharts. In such an embodiment, the computer program may be downloaded and installed from a network through the communication part 1509, and/or installed from the removable medium 1511. When the computer program is executed by the CPU 1501, the various functions defined in the system of this application are executed. For example, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The computer-readable medium of the embodiments of this application may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, apparatus, or device. In this application, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may be further any computer readable medium in addition to a computer-readable storage medium. The computer readable medium may send, propagate, or transmit a program that is used by or used in combination with an instruction execution system, apparatus, or device. The program code included in the computer-readable medium may be transmitted by using any suitable medium, including but not limited to: a wireless medium, a wired medium, or the like, or any suitable combination thereof.

In another aspect, this application further provides a computer readable medium, where the computer readable medium may be included in the image processing apparatus described in the foregoing embodiment; or may exist alone without being assembled into the electronic device. The computer-readable medium carries one or more programs, the one or more programs, when executed by the electronic device, causing the electronic device to implement the method described in the foregoing embodiments.

What is claimed is:

1. An image processing method performed by an electronic device, the method comprising:
   acquiring a diffuse reflection map and a shadow map of a three-dimensional (3D) model of an object, wherein the 3D model is constructed from a plurality of photos of the object within a predefined lighting environment;
   acquiring a shadow texel in a shadow region of the diffuse reflection map according to a corresponding shadow region in the shadow map;
   querying an average color lookup table according to spatial coordinate information of the shadow texel for an average brightness difference corresponding to the shadow texel; and
   determining restoration color information according to the average brightness difference, and restoring color information of the shadow texel according to the restoration color information.

2. The image processing method according to claim 1, wherein the acquiring a shadow texel in a shadow region of the diffuse reflection map comprises:
   acquiring a first UV coordinate of a texel of the corresponding shadow region in the shadow map; and
   performing matching between the first UV coordinate and a UV coordinate of a texel in the diffuse reflection map, to acquire a texel in the diffuse reflection map that matches the first UV coordinate as the shadow texel.

3. The image processing method according to claim 1, wherein the average color lookup table comprises a bright-side average color lookup table and a dark-side average color lookup table; and before the acquiring a shadow texel in a shadow region of the diffuse reflection map, the method further comprises:
   traversing all texels in the diffuse reflection map, adding color information of all the texels to a bright-side lookup table and a dark-side lookup table according to shadow information corresponding to all the texels in the shadow map, so as to form a bright-side color lookup table and a dark-side color lookup table;
   converting color information in the bright-side color lookup table according to a transparency value of a pixel in the bright-side color lookup table to obtain the bright-side average color lookup table; and
   converting color information in the dark-side color lookup table according to a transparency value of a pixel in the dark-side color lookup table to obtain the dark-side average color lookup table.

4. The image processing method according to claim 3, wherein after the acquiring the bright-side color lookup table and the dark-side color lookup table, the method further comprises:
   separately performing multi-level downsampling on the bright-side color lookup table and the dark-side color lookup table to acquire a bright-side average color map set and a dark-side average color map set, the bright-side average color map set comprising multiple bright-side average color maps of different sizes, and the dark-side average color map set comprising multiple dark-side average color maps of different sizes.

5. The image processing method according to claim 1, wherein the determining restoration color information according to the average brightness difference and color information corresponding to the shadow texel comprises:
   multiplying the average brightness difference by an RGB vector in the color information corresponding to the shadow texel to acquire the restoration color information.

6. The image processing method according to claim 1, wherein before the acquiring a shadow texel in a shadow region of the diffuse reflection map, the method further comprises:
   extracting an edge texel in the shadow map, and determining a central texel in the diffuse reflection map according to the edge texel;
   determining a target map region according to the central texel and a preset range, and determining a bright-part region and a dark-part region in the target map region according to the shadow map; and
   separately calculating a bright-part average color corresponding to the bright-part region and a dark-part average color corresponding to the dark-part region, determining an average brightness difference according to the bright-part average color and the dark-part average color, and adding the average brightness difference to the average color lookup table.

7. The image processing method according to claim 1, wherein the method further comprises:
   performing blur processing on an interface between the shadow texel and a non-shadow texel in the diffuse reflection map.

8. The image processing method according to claim 1, wherein the method further comprises:
   constructing a first average color lookup table according to normal information of each texel in the diffuse reflection map;
   determining, according to the first average color lookup table, overall average bright region color information corresponding to the diffuse reflection map, and acquiring an intermediate result map according to the first average color lookup table;
   constructing a second average color lookup table according to the intermediate result map and an ambient occlusion map; and
   traversing all texels in the intermediate result map, determining restoration color information according to color information of each texel in the second average color lookup table, and restoring a color of each texel according to the restoration color information.

9. An electronic device, comprising:
   one or more processors; and
   a storage apparatus, configured to store one or more programs that, when executed by the one or more processors, cause the electronic device to perform an image processing method including:
   acquiring a diffuse reflection map and a shadow map of a three-dimensional (3D) model of an object, wherein the 3D model is constructed from a plurality of photos of the object within a predefined lighting environment;
   acquiring a shadow texel in a shadow region of the diffuse reflection map according to a corresponding shadow region in the shadow map;
   querying an average color lookup table according to spatial coordinate information of the shadow texel for an average brightness difference corresponding to the shadow texel; and determining restoration color information according to the average brightness difference, and restoring color information of the shadow texel according to the restoration color information.

10. The electronic device according to claim 9, wherein the acquiring a shadow texel in a shadow region of the diffuse reflection map comprises:
   acquiring a first UV coordinate of a texel of the corresponding shadow region in the shadow map; and
   performing matching between the first UV coordinate and a UV coordinate of a texel in the diffuse reflection map, to acquire a texel in the diffuse reflection map that matches the first UV coordinate as the shadow texel.

11. The electronic device according to claim 9, wherein the average color lookup table comprises a bright-side average color lookup table and a dark-side average color lookup table; and before the acquiring a shadow texel in a shadow region of the diffuse reflection map, the method further comprises:
   traversing all texels in the diffuse reflection map, adding color information of all the texels to a bright-side lookup table and a dark-side lookup table according to shadow information corresponding to all the texels in the shadow map, so as to form a bright-side color lookup table and a dark-side color lookup table;
   converting color information in the bright-side color lookup table according to a transparency value of a pixel in the bright-side color lookup table to obtain the bright-side average color lookup table; and
   converting color information in the dark-side color lookup table according to a transparency value of a pixel in the dark-side color lookup table to obtain the dark-side average color lookup table.

12. The electronic device according to claim 11, wherein after the acquiring the bright-side color lookup table and the dark-side color lookup table, the method further comprises:
   separately performing multi-level downsampling on the bright-side color lookup table and the dark-side color lookup table to acquire a bright-side average color map set and a dark-side average color map set, the bright-side average color map set comprising multiple bright-side average color maps of different sizes, and the dark-side average color map set comprising multiple dark-side average color maps of different sizes.

13. The electronic device according to claim 9, wherein the determining restoration color information according to the average brightness difference and color information corresponding to the shadow texel comprises:
   multiplying the average brightness difference by an RGB vector in the color information corresponding to the shadow texel to acquire the restoration color information.

14. The electronic device according to claim 9, wherein before the acquiring a shadow texel in a shadow region of the diffuse reflection map, the method further comprises:
   extracting an edge texel in the shadow map, and determining a central texel in the diffuse reflection map according to the edge texel;
   determining a target map region according to the central texel and a preset range, and determining a bright-part region and a dark-part region in the target map region according to the shadow map; and
   separately calculating a bright-part average color corresponding to the bright-part region and a dark-part average color corresponding to the dark-part region, determining an average brightness difference according to the bright-part average color and the dark-part average color, and adding the average brightness difference to the average color lookup table.

15. The electronic device according to claim 9, wherein the method further comprises:
   performing blur processing on an interface between the shadow texel and a non-shadow texel in the diffuse reflection map.

16. The electronic device according to claim 9, wherein the method further comprises:
   constructing a first average color lookup table according to normal information of each texel in the diffuse reflection map;
   determining, according to the first average color lookup table, overall average bright region color information corresponding to the diffuse reflection map, and acquiring an intermediate result map according to the first average color lookup table;
   constructing a second average color lookup table according to the intermediate result map and an ambient occlusion map; and
   traversing all texels in the intermediate result map, determining restoration color information according to color information of each texel in the second average color lookup table, and restoring a color of each texel according to the restoration color information.

17. A non-transitory computer readable storage medium storing one or more programs that, when executed by one or more processors of an electronic device, cause the electronic device to perform an image processing method including:
   acquiring a diffuse reflection map and a shadow map of a three-dimensional (3D) model of an object, wherein the 3D model is constructed from a plurality of photos of the object within a predefined lighting environment;
   acquiring a shadow texel in a shadow region of the diffuse reflection map according to a corresponding shadow region in the shadow map;
   querying an average color lookup table according to spatial coordinate information of the shadow texel for an average brightness difference corresponding to the shadow texel; and
   determining restoration color information according to the average brightness difference, and restoring color information of the shadow texel according to the restoration color information.

18. The non-transitory computer readable storage medium according to claim 17, wherein the acquiring a shadow texel in a shadow region of the diffuse reflection map comprises:
   acquiring a first UV coordinate of a texel of the corresponding shadow region in the shadow map; and
   performing matching between the first UV coordinate and a UV coordinate of a texel in the diffuse reflection map, to acquire a texel in the diffuse reflection map that matches the first UV coordinate as the shadow texel.

19. The non-transitory computer readable storage medium according to claim 17, wherein the average color lookup table comprises a bright-side average color lookup table and a dark-side average color lookup table; and before the acquiring a shadow texel in a shadow region of the diffuse reflection map, the method further comprises:
   traversing all texels in the diffuse reflection map, adding color information of all the texels to a bright-side lookup table and a dark-side lookup table according to shadow information corresponding to all the texels in the shadow map, so as to form a bright-side color lookup table and a dark-side color lookup table;
   converting color information in the bright-side color lookup table according to a transparency value of a pixel in the bright-side color lookup table to obtain the bright-side average color lookup table; and converting color information in the dark-side color lookup table according to a transparency value of a pixel in the dark-side color lookup table to obtain the dark-side average color lookup table.

20. The non-transitory computer readable storage medium according to claim 17, wherein before the acquiring a shadow texel in a shadow region of the diffuse reflection map, the method further comprises:

extracting an edge texel in the shadow map, and determining a central texel in the diffuse reflection map according to the edge texel;

determining a target map region according to the central texel and a preset range, and determining a bright-part region and a dark-part region in the target map region according to the shadow map; and separately calculating a bright-part average color corresponding to the bright-part region and a dark-part average color corresponding to the dark-part region, determining an average brightness difference according to the bright-part average color and the dark-part average color, and adding the average brightness difference to the average color lookup table.

\* \* \* \* \*